United States Patent [19]
Gould

[11] Patent Number: 5,794,189
[45] Date of Patent: Aug. 11, 1998

[54] CONTINUOUS SPEECH RECOGNITION

[75] Inventor: Joel M. Gould, Winchester, Mass.

[73] Assignee: Dragon Systems, Inc., Newton, Mass.

[21] Appl. No.: 556,280

[22] Filed: Nov. 13, 1995

[51] Int. Cl.$^6$ .............................. G10L 5/06; G10L 9/00
[52] U.S. Cl. .................... 704/231; 704/232; 704/251; 704/257; 704/258
[58] Field of Search ...................... 395/2.4, 2.6, 2.66, 395/2.67; 704/232, 251, 257, 258

[56] References Cited

U.S. PATENT DOCUMENTS

| | | | |
|---|---|---|---|
| 4,688,195 | 8/1987 | Thompson et al. | 364/300 |
| 4,776,016 | 10/1988 | Hansen | 381/42 |
| 4,783,803 | 11/1988 | Baker et al. | 381/42 |
| 4,827,520 | 5/1989 | Zeinstra | 381/43 |
| 4,829,576 | 5/1989 | Porter | 381/43 |
| 4,833,712 | 5/1989 | Bahl et al. | 381/43 |
| 4,837,831 | 6/1989 | Gillick et al. | 704/215 |
| 4,866,778 | 9/1989 | Baker | 381/43 |
| 4,903,305 | 2/1990 | Gillick et al. | 704/275 |
| 4,914,703 | 4/1990 | Gillick | 704/275 |
| 4,914,704 | 4/1990 | Cole et al. | 381/43 |
| 4,931,950 | 6/1990 | Isle et al. | 364/513 |
| 4,962,535 | 10/1990 | Kimara et al. | 381/43 |
| 4,984,177 | 1/1991 | Rondel et al. | 364/513.5 |
| 5,027,406 | 6/1991 | Roberts et al. | |
| 5,036,538 | 7/1991 | Oken et al. | 381/43 |
| 5,086,472 | 2/1992 | Yoshida | 381/43 |
| 5,095,508 | 3/1992 | Fujimoto | 381/43 |
| 5,127,055 | 6/1992 | Larkey | |
| 5,202,952 | 4/1993 | Gillick et al. | |
| 5,231,670 | 7/1993 | Goldhor et al. | 381/43 |
| 5,377,303 | 12/1994 | Firman | 704/275 |
| 5,428,707 | 6/1995 | Gould et al. | 395/2.4 |

OTHER PUBLICATIONS

U.S. Patent Application "Continuous Speech Recognition of Text and Commands," Ser. No. 08/559,207, Joel M. Gould et al., filed Nov. 13, 1995.

Dale Evans, "Talking to the Bug," Microcad News, pp. 58–61, Mar. 1989.

Mandel, Mark A. et al., "A Commercial Large–Vocabulary Discrete Speech Recognition System: DragonDictate,"Language and Speech, vol. 35 (1, 2) (1992), pp. 237–246.

U.S. Patent Application, "Apparatuses and Methods for Training ad Operating Speech Recognition Systems" Joel. M. Gould et al., filed Feb. 1, 1995.

U.S. Patent Application, "Speech Recognition," Ser. No. 08/521,543, Gregory J. Gadbois, filed Aug. 30, 1995.

U.S. Patent Application, "Speech Recognition," Ser. No. 08/559,190, Gregory J. Gadbois, filed Nov. 13, 1995.

Itou K et al, Contin. Speech Recog. by Context–Dependent Phonetic HMM, ICASSP, pp. I–21 to I–24, Mar. 1992.

*Primary Examiner*—David R. Hudspeth
*Assistant Examiner*—Robert Louis Sax
*Attorney, Agent, or Firm*—Fish & Richardson PC

[57] ABSTRACT

A method for use in recognizing speech in which signals are accepted corresponding to interspersed speech elements including text elements corresponding to text to be recognized and command elements to be executed. The elements are recognized. Modification procedures are executed in response to recognized predetermined ones of the command elements. The modification procedures include refraining from training speech models when the modification procedures do not correct a speech recognition error. In another aspect, the modification procedures include simultaneously modifying previously recognized ones of the text elements.

33 Claims, 24 Drawing Sheets

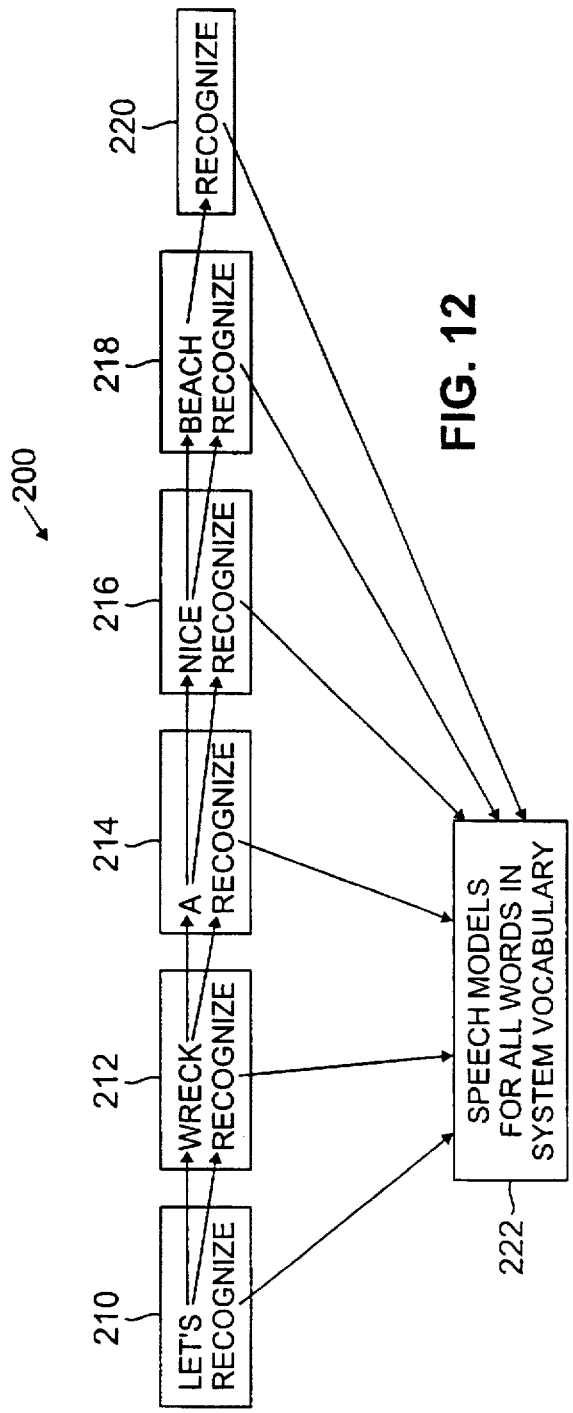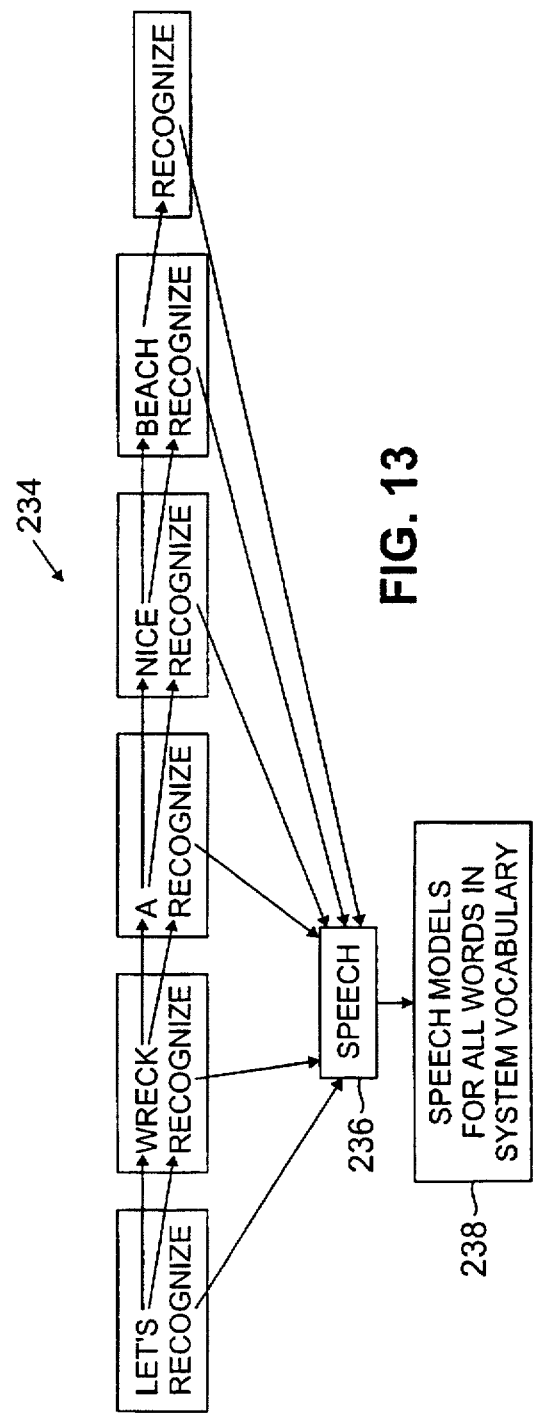

CONTINUOUS SPEECH RECOGNITION

BACKGROUND

This invention relates to continuous speech recognition.

Many speech recognition systems, including DragonDictate™ from Dragon Systems™ of West Newton, Mass., store data representing a user's speech (i.e., speech frames) for a short list of words., e.g., 32, just spoken by the user. If a user determines that a word was incorrectly recognized, the user calls up (by keystroke, mouse selection, or utterance) a correction window on a display screen. The correction window displays the short list of words or a portion of the short list of words, and the user selects the misrecognized word for correction. Selecting a word causes the speech recognition system to re-recognize the word by comparing the stored speech frames associated with the word to a vocabulary of speech models. The comparison provides a choice list of words that may have been spoken by the user and the system displays the choice list for the user. The user then selects the correct word from the choice list or the user verbally spells the correct word in the correction window. In either case, the system replaces the incorrect word with the correct word and adapts (i.e., trains) the speech models represent the correct word using associated speech frames.

For more information on training speech models, see U.S. Pat. No. 5,027,406, entitled "Method for Interactive Speech Recognition and Training", and U.S. patent application Ser. No. 08/382,752, entitled "Apparatuses and Methods for Training and Operating Speech Recognition Systems", which are incorporated by reference. For more information on choice lists and alphabetic prefiltering see U.S. Pat. No. 4,783,803, entitled "Speech Recognition Apparatus and Method", U.S. Pat. No. 4,866,778, entitled "Interactive Speech Recognition Apparatus", and U.S. Pat. No. 5,027,406, entitled "Method for Interactive Speech Recognition and Training", which are incorporated by reference.

Aside from correcting speech recognition errors, users often change their mind regarding previously entered text and want to replace one or more previously entered words with different words. To do this editing, users frequently call up the correction window, select a previously entered word, and then type or speak a different word. The system replaces the previously entered word with the different word, and, because training is continuous, the system also adapts the speech models associated with the different word with the speech frames from the original utterance. This "misadaptation" may degrade the integrity of the speech models for the different word and reduce speech recognition accuracy.

For example, the user may have entered "It was a rainy day" and may want the text to read "It was a cold day." If the user calls up the correction window, selects the word "rainy" and types in or speaks the word "cold", the system replaces the word "rainy" with the word "cold" and misadapts the speech models for "cold" with the speech models for "rainy".

If the speech recognition system misrecognizes one or more word boundaries, then the user may need to correct two or more words. For example, if the user says "let's recognize speech" and the system recognizes "let's wreck a nice beach," then the user needs to change "wreck a nice beach" to "recognize speech." The user may call up the correction window and change each word individually using the choice list for each word. For example, the user may call up the correction window and select "wreck" as the word to be changed and choose "recognize" from the choice list (if available) or enter (by keystroke or utterance: word or spelling) "recognize" into the correction window. The user may then select and reject (i.e., delete) "all" and then "nice", and lastly the user may select "beach" and choose "speech" from the choice list or enter "speech" into the correction window.

Alternatively, after the user has called up the correction window and chosen "recognize", some speech recognition systems permit the user to enter a space after "recognize" to indicate to the system that another word correction follows. The system re-recognizes the speech frames following the newly entered word "recognize" and provides a hypothesis (e.g., "speech") and a corresponding choice list for the user. The user chooses either the hypothesis or a word from the choice list and may again follow that word with a space to cause the system to re-recognize a next word.

Other speech recognition systems have large storage capabilities that store all speech frames associated with user utterances and record all user utterances. The user may select a previously spoken word to have the system play back the user's original utterance. If the utterance does not match the recognized word (i.e., the system misrecognized the word), then the user may call up a correction window and type or speak the correct word to have the system make the correction and train the speech models for the corrected word. This may reduce speech model misadaptation by requiring the user to determine whether the system actually misrecognized the word before speech models are trained.

SUMMARY

In general, in one aspect, the invention features a method for use in recognizing speech. Signals are accepted corresponding to interspersed speech elements including text elements corresponding to text to be recognized and command elements to be executed. The elements are recognized. Modification procedures are executed in response to recognized predetermined ones of the command elements. The modification procedures include refraining from training speech models when the modification procedures do not correct a speech recognition error.

In general, in another aspect, the modification procedures include simultaneously modifying previously recognized ones of the text elements.

Implementations of the invention may include one or more of the following features. Text element boundaries (e.g., misrecognized boundaries) of the previously recognized ones of the text elements may be modified. Executing the modification procedures may include detecting a speech recognition error, and training speech models in response to the detected speech recognition error. The detecting may include determining whether speech frames or speech models corresponding to a speech recognition modification match at least a portion of the speech frames or speech models corresponding to previous utterances. Matching speech frames or speech models may be selected. The predetermined command elements may include a select command and an utterance representing a selected recognized text element to be corrected. The selected recognized text element may be matched against previously recognized text elements. Previously recognized text elements may be parsed and a tree structure may be built that represents the ordered relationship among the previously recognized text elements. The tree structure may reflect multiple occurrences of a given previously recognized one of the text elements. The utterance may represent a sequence of multiple selected recognized text elements. One of the recognized text elements may be modified based on correction information provided by a user speaking substitute text. The correction information may include correction of boundaries between text elements. The method of claim 1 in which the modification procedures include modifying one or more of the most recently recognized text elements.

The predetermined command elements may include a command (e.g., "oops") indicating that a short term correction is to be made. The modification procedures may include interaction with a user with respect to modifications to be made. The interaction may include a display window in which proposed modifications are indicated. The interaction may include a user uttering the spelling of a word to be corrected. The modification procedures may include building a tree structure grouping speech frames corresponding to possible text elements in branches of the tree. The most recently recognized text elements may be re-recognized using the speech frames of the tree structure. The tree may be used to determine, text element by text element, a match between a correction utterance and the originally recognized text elements. The modification procedures may include, after determining a match, re-recognizing subsequent speech frames of an original utterance. If no match is determined, the recognized correction utterance may be displayed to the user. The command may indicate that the user wishes to delete a recognized text element. The text element may be the most recently recognized text element.

The predetermined command may be "scratch that". The command may be followed by a pause and the most recently recognized text element may then be deleted. The command may be followed by an utterance corresponding to a substitute text element and the substitute text element is then substituted for the most recently recognized text element.

The advantages of the invention may include one or more of the following. Providing the user with a variety of editing/correcting techniques allows the user to choose how they will edit or correct previously entered text. The technique chosen may depend upon the edit or correction to be made or the user may choose the technique with which they are most comfortable. The different techniques also allow users flexibility as to when changes or corrections are made. For example, the user may edit continuously while dictating text or the user may dictate an entire document before going back to make changes or corrections. Furthermore, the user's cognitive overhead for correcting and editing previously entered text is reduced. For instance, speech models may be trained only when the speech recognition system, not the user, determines that a word or series of words has been misrecognized. Similarly, in response to a user's correction, the system may automatically modify word boundaries to simultaneously change a first number of words into a second number of different words.

Other advantages and features will become apparent from the following description and from the claims.

DESCRIPTION

FIGS. 12 and 13 are block diagrams of short term error correction feature tree structures.

Figure 1:
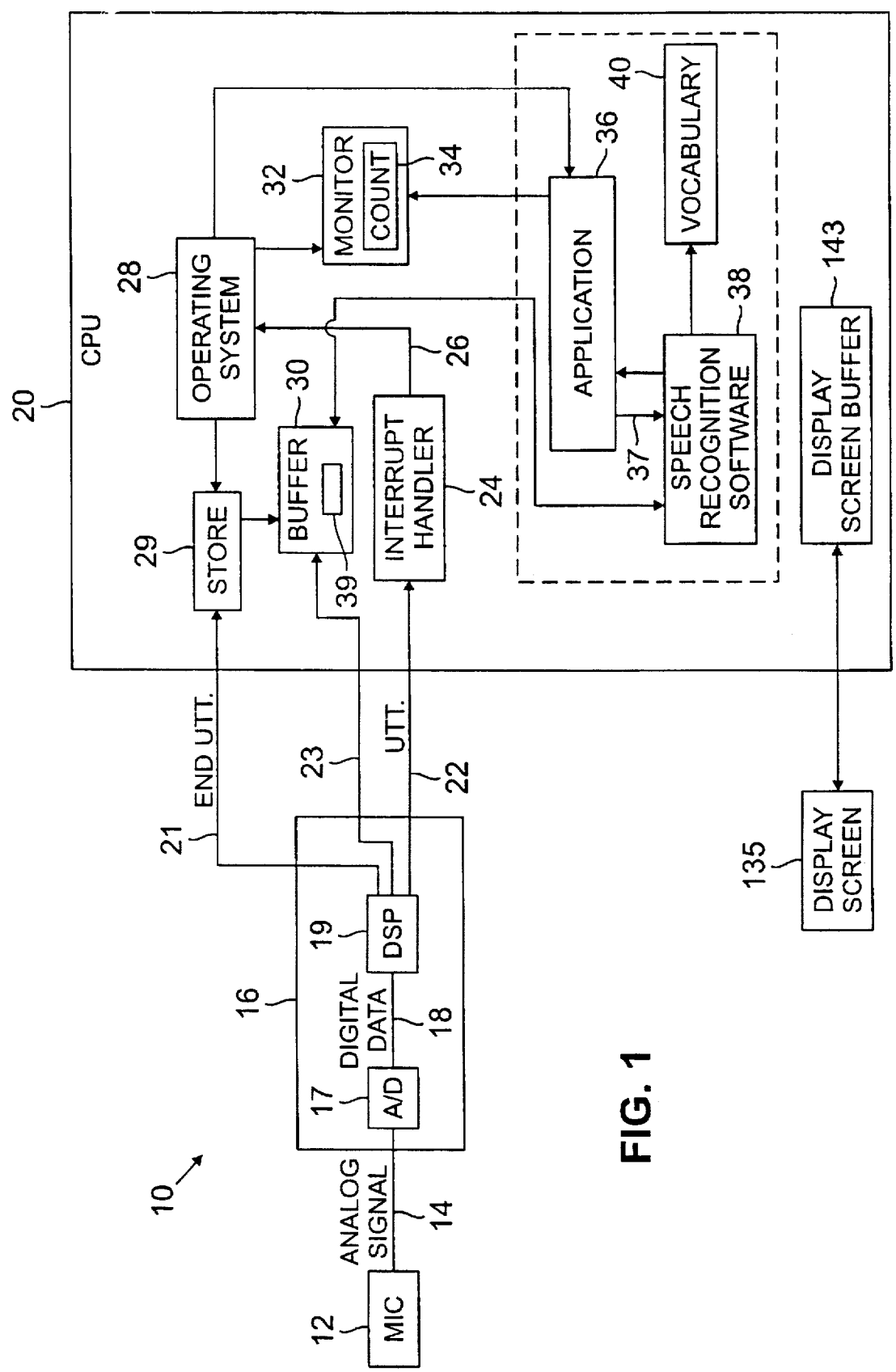
FIG. 1 is a block diagram of a speech recognition system.

The speech recognition system includes several correction/editing features. Using one correction feature termed "short term error correction," the user calls up (by keystroke, mouse selection, or utterance, e.g., "oops") a correction window and enters (by keystroke or utterance) one or more previously spoken words to correct a recently misrecognized utterance. The system compares speech models (for typed words) or speech frames (for spoken words) associated with the correction against the speech frames of a predetermined number, e.g., three, of the user's previous utterances. If the comparison locates speech frames corresponding to a portion of one of the user's previous three utterances that substantially match the speech models or frames of user's correction, then the system modifies the original recognition to include the correction. The modification of the original utterance includes re-recognizing the speech frames around the correction. As a result, a user may simultaneously correct one word, a series of words, or an entire utterance, including correcting misrecognized word boundaries. The speech frames from the original utterance are also used to train (i.e., adapt) the speech models for the correction.

If the comparison does not locate speech frames corresponding to a portion of one of the user's previous three utterances that substantially match the user's correction, then the system notifies the user that the correction cannot be made. For example, if the user erroneously enters one or more different words as a correction, the comparison will not locate corresponding speech frames in one of the user's previous three utterances. This reduces the possibility that speech models may be misadapted.

Another editing feature, termed "long term editing," allows the user to select and modify previously entered text. After selecting text through keystrokes or mouse selection or by speaking the words to be selected, the user modifies the selected text by typing or speaking replacement words. The user may simultaneously modify one word, a series of words, or an entire utterance, including correcting misrecognized word boundaries. Because the user may use long term editing to edit previously entered text or to correct speech recognition errors, the system does not automatically train the speech models for the modifications which substantially prevents misadaptation of speech models. The user may, however, request that the system train the speech models for a modification.

A correction/editing feature, termed "scratch that and repeat", allows the user to quickly and easily delete or delete and replace his or her most recent utterance. After speaking an utterance, if the user determines that the system did not correctly recognize the previous utterance, the user selects (by keystroke, mouse selection, or utterance, e.g., "scratch that") a scratch command and repeats the utterance. The system replaces the words recognized from the original utterance with words recognized from the second utterance. If the user wants to delete the words of the previous utterance, the user enters the scratch that command alone (e.g., followed by silence), and if the user wants to edit the words of the previous utterance, the user speaks "scratch that" followed by new text. In any case, the system does not train speech models in accordance with any replacement text which reduces the possibility of misadaptation of speech models.

Referring to FIG. 1, a typical speech recognition system 10 includes a microphone 12 for converting a user's speech into an analog data signal 14 and a sound card 16. The sound card includes a digital signal processor (DSP) 19 and an analog-to-digital (A/D) converter 17 for converting the analog data signal into a digital data signal 18 by sampling the analog data signal at about 11 Khz to generate 220 digital samples during a 20 msec time period. Each 20 ms time period corresponds to a separate speech frame. The DSP 20 processes the samples corresponding to each speech frame to generate a group of parameters associated with the analog data signal during the 20 ms period. Generally, the parameters represent the amplitude of the speech at each of a set of frequency bands.

The DSP also monitors the volume of the speech frames to detect user utterances. If the volume of three consecutive speech frames within a window of five consecutive speech frames (i.e., three of the last five speech frames) exceeds a predetermined speech threshold, for example, 20 dB, then the DSP determines that the analog signal represents speech and the DSP begins sending several, e.g., three, speech frames of data at a time (i.e., a batch) via a digital data signal 23 to a central processing unit (CPU) 20. The DSP asserts an utterance signal (Utt) 22 to notify the CPU each time a batch of speech frames representing an utterance is sent via the digital data signal.

When an interrupt handler 24 on the CPU receives assertions of Utt signal 22, the CPU's normal sequence of execution is interrupted. Interrupt signal 26 causes operating system software 28 to call a store routine 29. Store routine 29 stores the incoming batch of speech frames into a buffer 30. When fourteen consecutive speech frames within a window of nineteen consecutive speech frames fall below a predetermined silence threshold, e.g., 6 dB, then the DSP stops sending speech frames to the CPU and asserts an End_Utt signal 21. The End_Utt signal causes the store routine to organize the batches of previously stored speech frames into a speech packet 39 corresponding to the user utterance.

Interrupt signal 26 also causes the operating system software to call monitor software 32. Monitor software 32 keeps a count 34 of the number of speech packets stored but not yet processed. An application 36, for example, a word processor, being executed by the CPU periodically checks for user input by examining the monitor software's count. If the count is zero, then there is no user input. If the count is not zero, then the application calls speech recognizer software 38 and passes a pointer 37 to the address location of the speech packet in buffer 30. The speech recognizer may be called directly by the application or may be called on behalf of the application by a separate program, such as Dragon-Dictate™ from Dragon Systems™ of West Newton, Mass., in response to the application's request for input from the mouse or keyboard.

For a more detailed description of how user utterances are received and stored within a speech recognition system, see U.S. Pat. No. 5,027,406, entitled "Method for Interactive Speech Recognition and Training" which is incorporated by reference.

Figure 2:
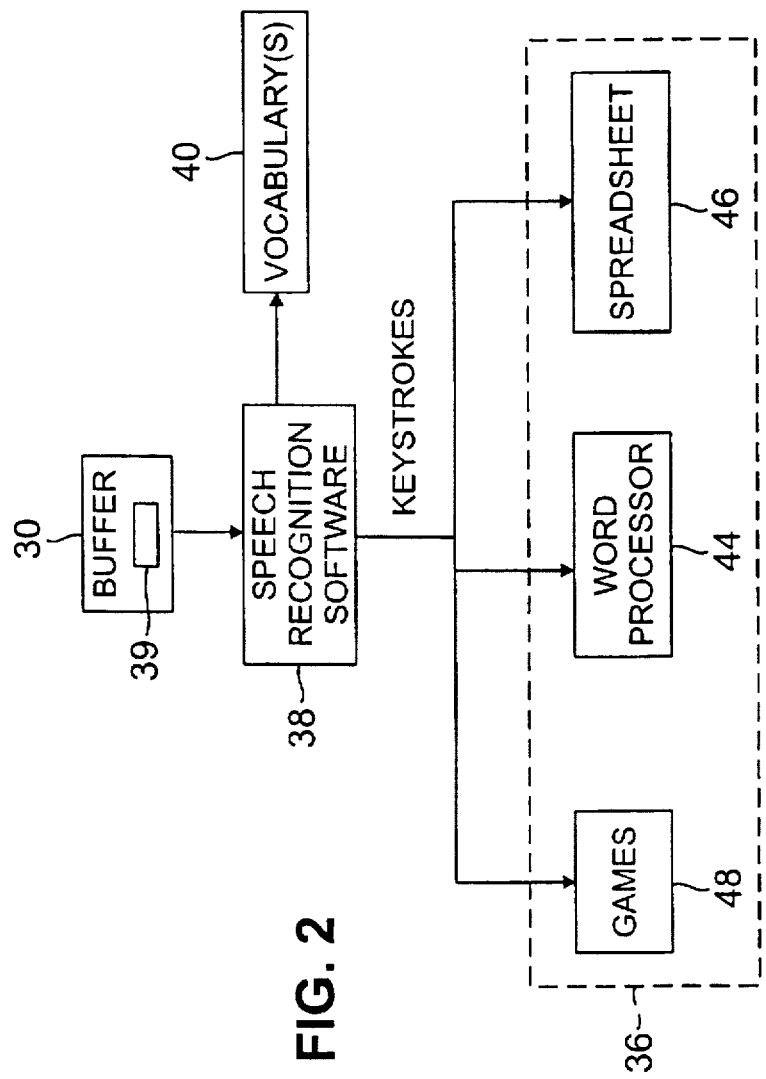
FIG. 2 is a block diagram of speech recognition software and application software.

Referring to FIG. 2, to determine what words have been spoken speech recognition software 38 causes the CPU to retrieve speech frames within speech packet 39 from buffer 30 and compare the speech frames (i.e., the user's speech) to speech models stored in one or more vocabularies 40. For a more detailed description of continuous speech recognition, see U.S. Pat. No. 5,202,952, entitled "Large-Vocabulary Continuous Speech Prefiltering and Processing System", which is incorporated by reference.

The recognition software uses common script language interpreter software to communicate with the application 36 that called the recognition software. The common script language interpreter software enables the user to dictate directly to the application either by emulating the computer keyboard and converting the recognition results into application dependent keystrokes or by sending application dependent commands directly to the application using the system's application communication mechanism (e.g., Microsoft Windows™ uses Dynamic Data Exchange™). The desired applications include, for example, word processors 44 (e.g., Word Perfect™ or Microsoft Word™), spreadsheets 46 (e.g., Lotus 1-2-3™ or Excel™), and games 48 (e.g., Solitaire™).

As an alternative to dictating directly to an application, the user dictates text to a speech recognizer window, and after dictating a document, the user transfers the document (manually or automatically) to the application.

Figure 3:
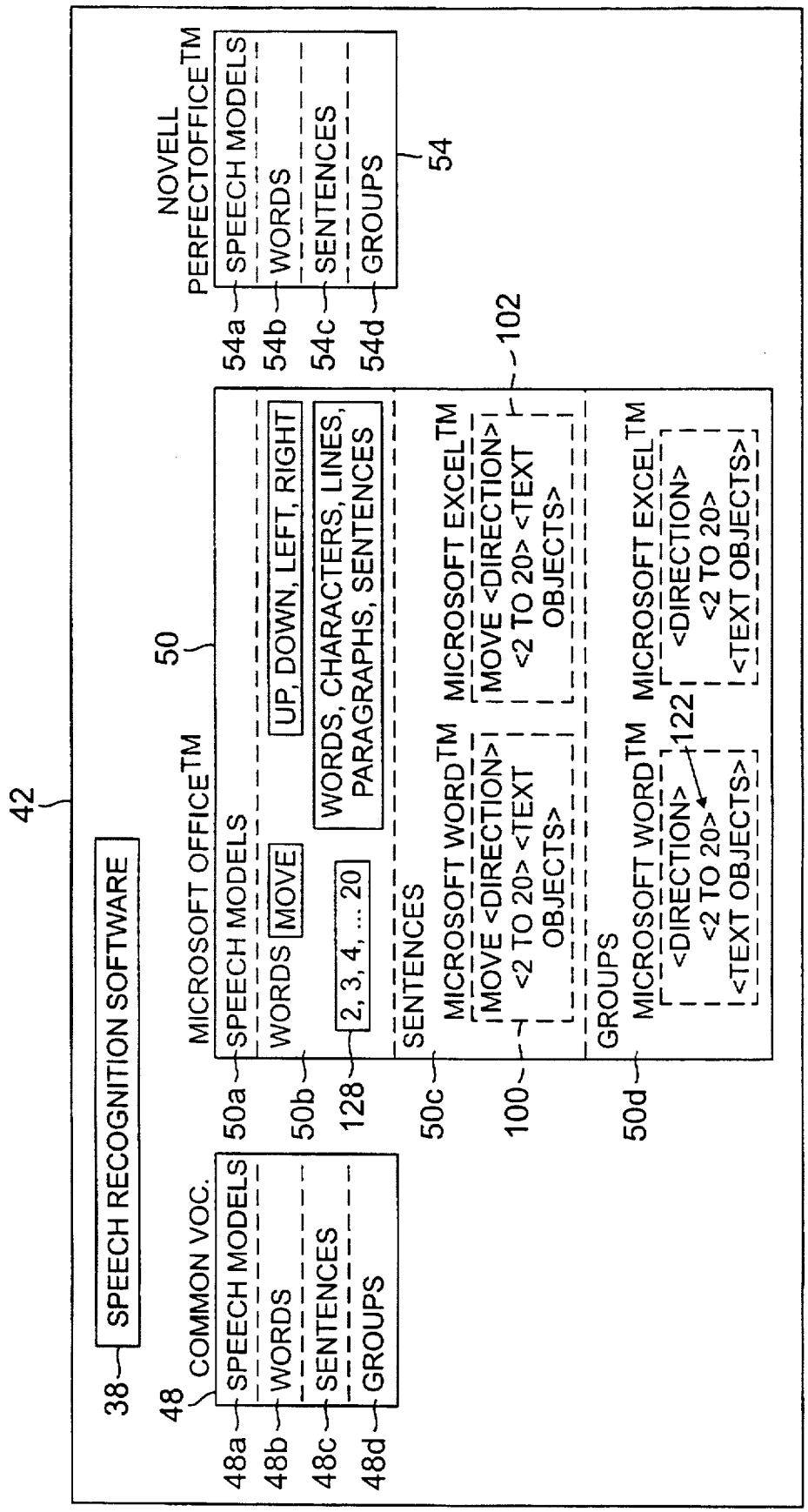
FIG. 3 is a block diagram of speech recognition software and vocabularies stored in memory.

Referring to FIG. 3, when an application first calls the speech recognition software, it is loaded from remote storage (e.g., a disk drive) into the computer's local memory 42. One or more vocabularies, for example, common vocabulary 48 and Microsoft Office™ vocabulary 50, are also loaded from remote storage into memory 42. The vocabularies 48, 50, and 54 include all words 48b, 50b, and 54b (text and commands), and corresponding speech models 48a, 50a, and 54a, that a user may speak.

Spreading the speech models and words across different vocabularies allows the speech models and words to be grouped into vendor (e.g., Microsoft™ and Novell™) dependent vocabularies which are only loaded into memory when an application corresponding to a particular vendor is executed for the first time after power-up. For example, many of the speech models and words in the Novell PerfectOffice™ vocabulary 54 represent words only spoken when a user is executing a Novell PerfectOffice™ application, e.g., WordPerfect™. As a result, these speech models and words are only needed when the user executes a Novell™ application. To avoid wasting valuable memory space, the Novell PerfectOffice™ vocabulary 54 is only loaded into memory when needed (i.e., when the user executes a Novell™ application).

Alternatively, the speech models and words are grouped into application dependent vocabularies. For example, separate vocabularies may exist for Microsoft Word™, Microsoft Excel™, and Novell WordPerfect™. Similarly, the speech models and words corresponding to commands may be grouped into one set of vocabularies while the speech models and words corresponding to text may grouped into another set of vocabularies. As another alternative, only a single vocabulary including all words, and corresponding speech models, that a user may speak is loaded into local memory and used by the speech recognition software to recognize a user's speech.

Figure 4:
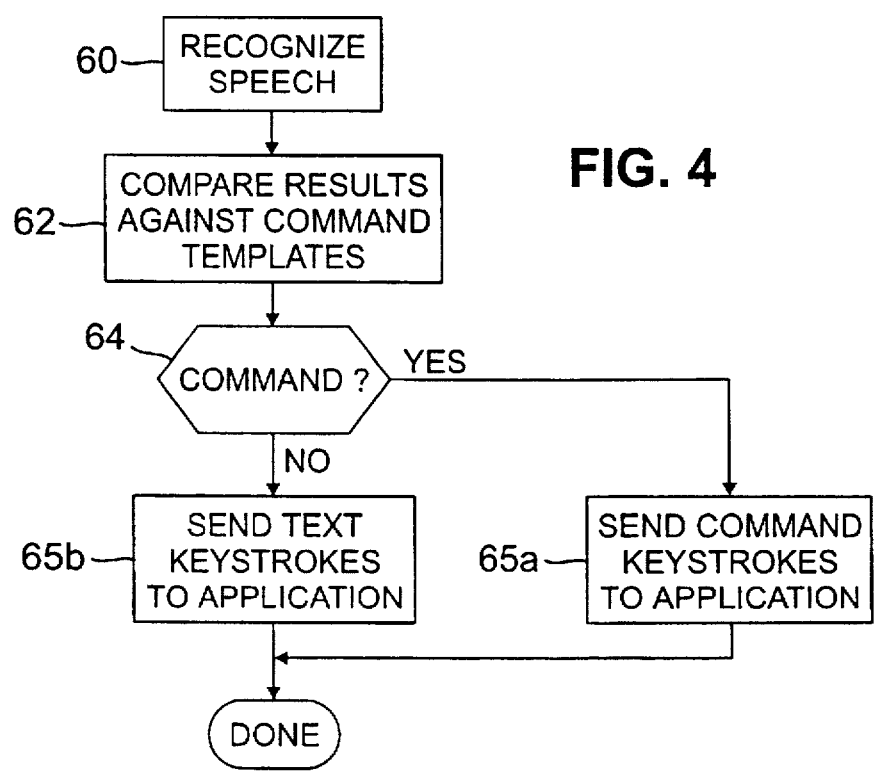
FIG. 4 is computer screen display of word processing command words and sentences.

Referring to FIG. 4, once the vocabularies are loaded and an application calls the recognition software, the CPU compares speech frames representing the user's speech to speech models in the vocabularies to recognize (step 60) the user's speech. The CPU then determines (steps 62 and 64) whether the results represent a command or text. Commands include single words and phrases and sentences that are defined by templates (i.e., restriction rules). The templates define the words that may be said within command sentences and the order in which the words are spoken. The CPU compares (step 62) the recognition results to the possible command words and phrases and to command templates, and if the results match a command word or phrase or a command template (step 64), then the CPU sends (step 65a) the application that called the speech recognition software keystrokes or scripting language that cause the application to execute the command, and if the results do not match a command word or phrase or a command template, the CPU sends (step 65b) the application keystrokes or scripting language that cause the application to type the results as text.

For more information on this and other methods of distinguishing between text and commands, see U.S. patent application Ser. No. 08/559,207, entitled "Continuous Speech Recognition of Text and Commands", filed the same day and assigned to the same assignee as this application, which is incorporated by reference.

Referring back to FIG. 3, in addition to including words 51 (and phrases) and corresponding speech models 53, the vocabularies include application (e.g., Microsoft Word™ 100 and Microsoft Excel™ 102) dependent command sentences 48c, 50c, and 54c available to the user and application dependent groups 48d, 50d, and 54d which are pointed to by the sentences and which point to groups of variable words in the command templates.

Long Term Editing

Figure 5:
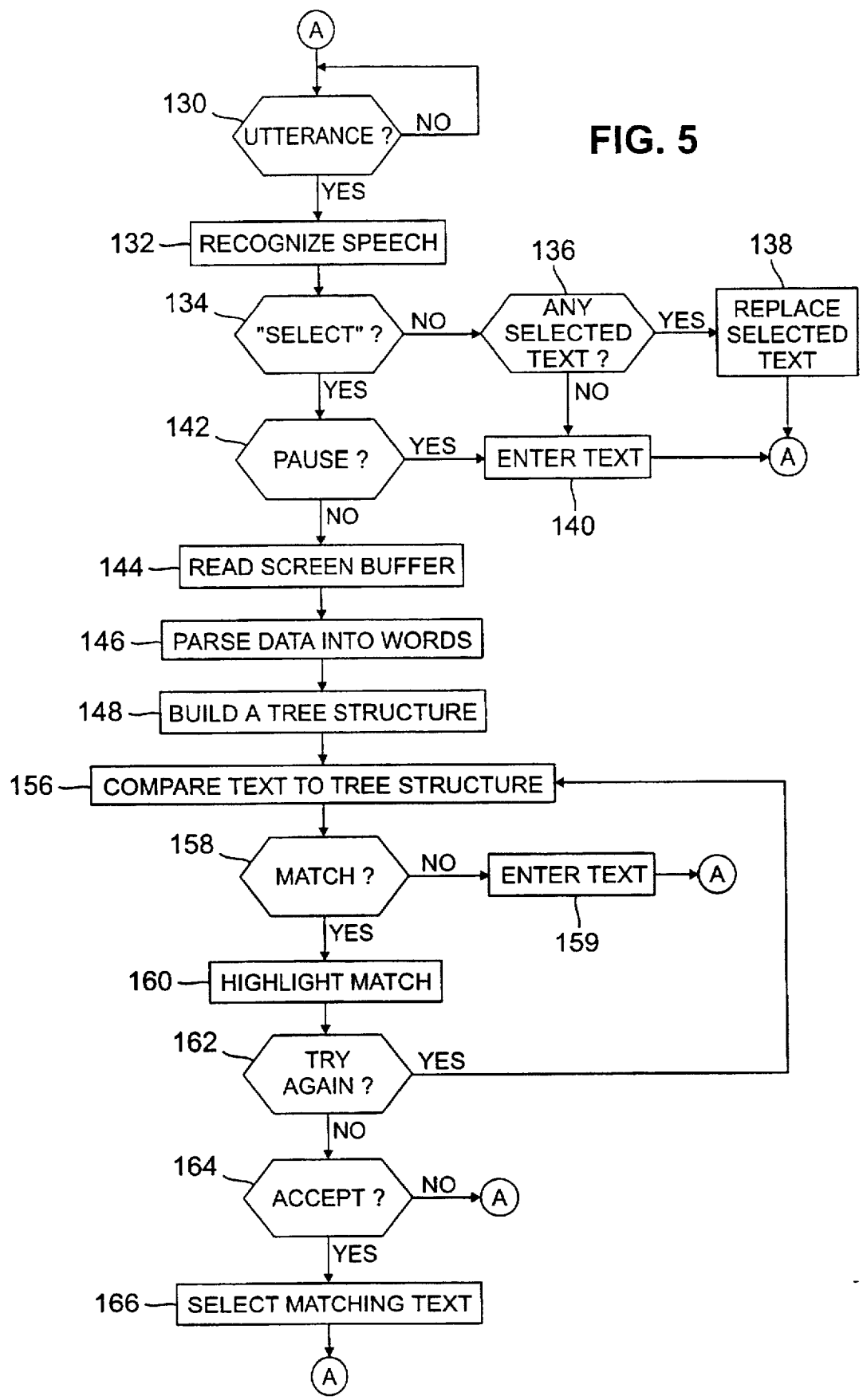
FIG. 5 is a flow chart depicting a long term editing feature.

The long term editing feature provides the user with the flexibility to edit text that was just entered (correctly or incorrectly) into an open document or to open an old document and edit text entered at an earlier time. Referring to FIG. 5, the system first determines (step 130) whether the user has spoken, and if so, the system recognizes (step 132) the user's speech. The system then determines (step 134) whether the user said "select". If the user did not say "select", the system determines (step 136) whether any text is selected. If text was selected, the system replaces (step 138) the selected text with the newly recognized text on a display screen 135 (FIG. 1). If no other text is selected, the system enters (step 140) the newly recognized text on the display screen.

If the system determines (step 134) that the user did say "select", then the system determines (step 142) whether "select" is followed by a pause. If "select" is followed by a pause, then the system enters (step 140) the word "select" on the display screen. If "select" is not followed by a pause, then the system reads (step 144) data stored in a display screen buffer 143 (FIG. 1). This data represents the succession of words displayed on the display screen and may be read through a standard edit control request to the operating system or through an application program interface (API) corresponding to the application being executed, for example, Microsoft Word™ or Novell Wordperfect™.

The system parses (step 146) the stored data and maps each word into indices in one or more vocabularies consisting of, for example, 180,000, words. As an example, "hello there." is parsed into three words, "hello" "there" and "period", while "New York", a phrase, is parsed into one "word". If the data represents a word that is not in the one or more vocabularies, then the system does not index the word or the system indexes the word after generating an estimated pronunciation using known text-to-speech synthesis rules.

Figure 6:
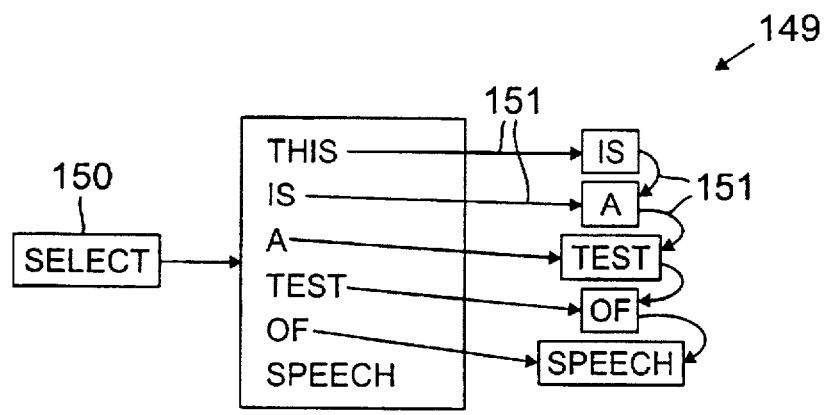
FIGS. 6 and 7 are block diagrams of long term editing feature tree structures.
Figure 7:
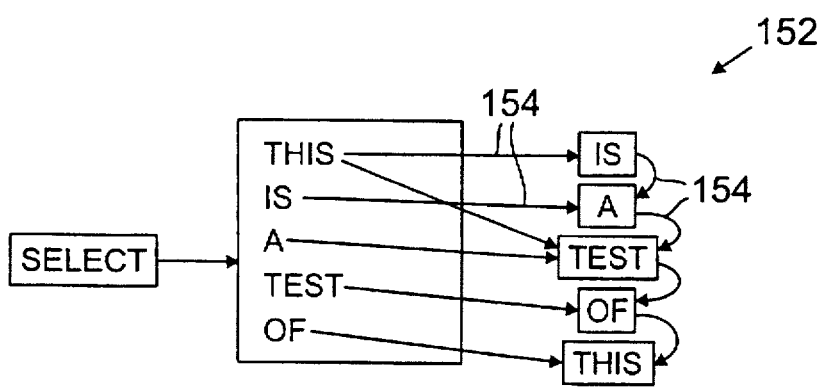

Using the parsed words, the system builds (step 148) a tree structure that describes the connection between the words being displayed. Referring to FIG. 6, if the display screen displays "This is a test of speech", then the system builds a tree structure 149 beginning with the word "select" 150 that indicates (arrows 151) that the word "select" must be followed by at least one of the words being displayed: "This", "is", "a", "test", "of", or "speech". For example, according to tree structure 149, if "This" follows "select", then "is" must be next, if "is" follows "select", then "a" must be next, if "a" follows "select" then "test" must be next, if "test" follows "select" then "of" must be next, if "of" follows "select" then "speech" must be next, and if "speech" follows "select", then silence must follow. The tree structure also accounts for repeated words. Referring to FIG. 7, if the display screen displays "This is a test of this test", then the system builds a tree structure 152 that indicates (arrows 154) that the word "test" may follow the words "a" or "this".

As an alternative to executing steps 144, 146, and 148 after the select command is recognized, the system may execute these steps before the select command is issued by the user (e.g., when a document is first opened and each time the words on the display screen change) or the system may execute these steps when the select command is partially recognized (e.g., when the user says "select").

Figure 8A:
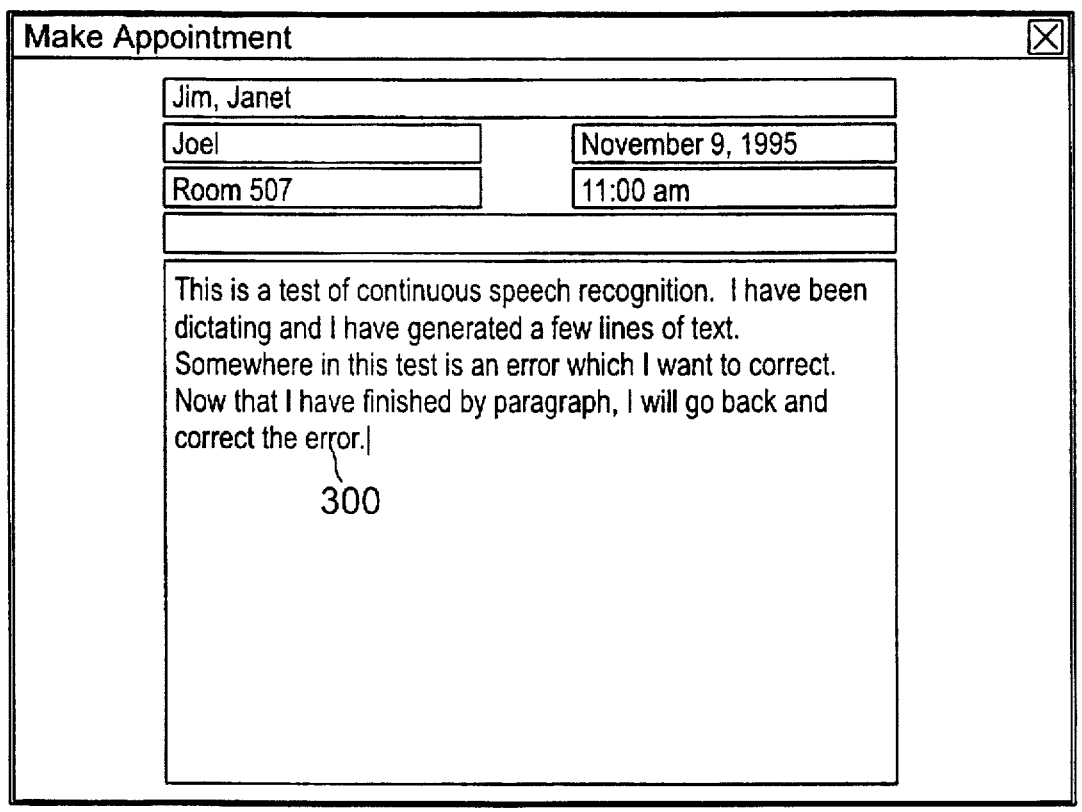
FIGS. 8a–8f are computer screen displays depicting the long term editing feature.
Figure 8B:
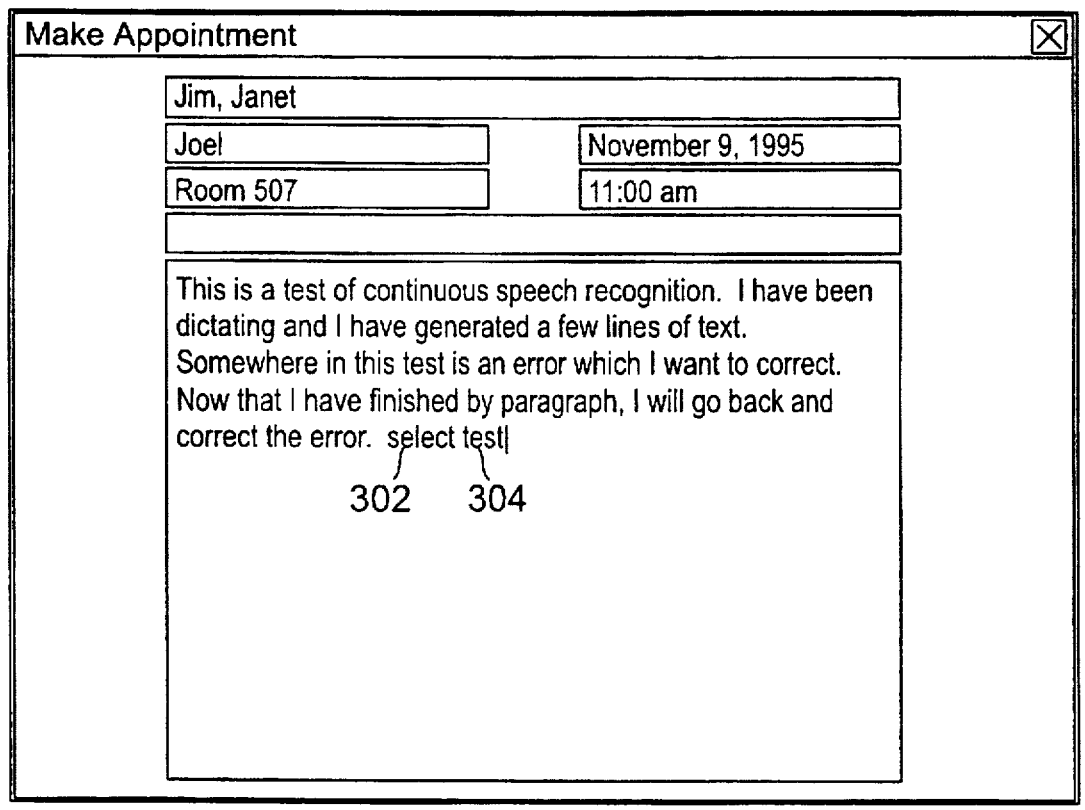
Figure 8C:
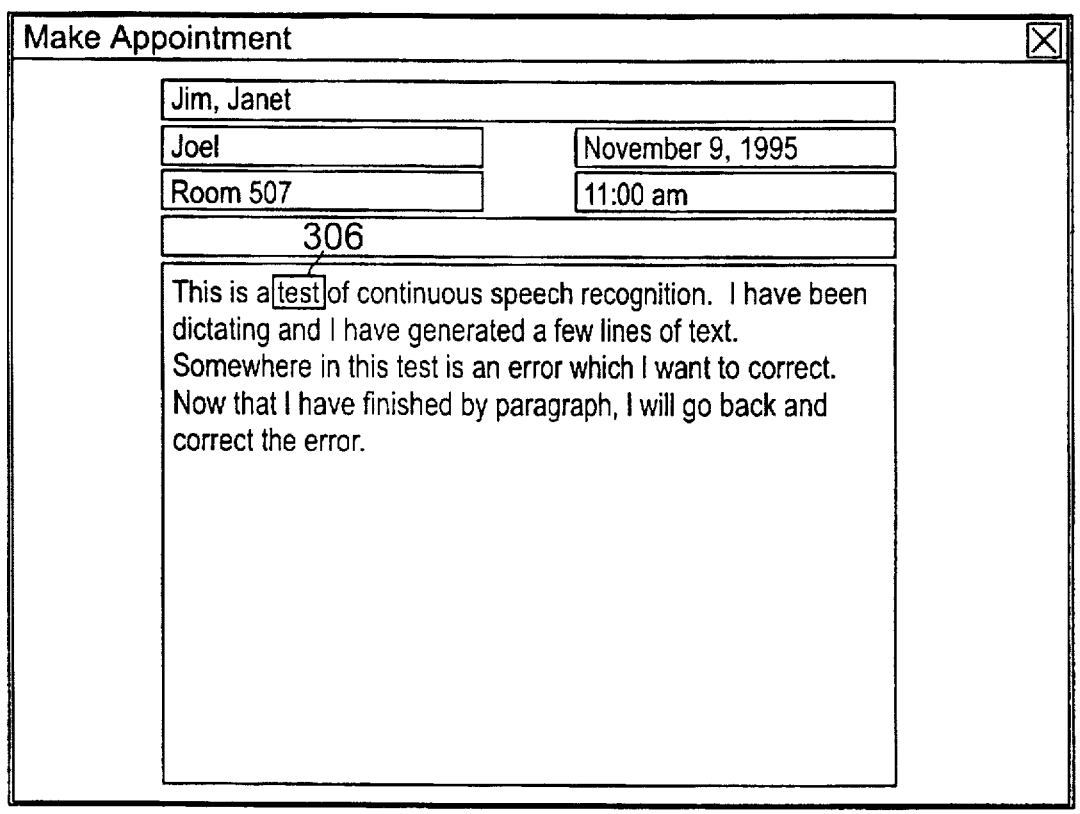

Referring also to FIGS. 8a–8c, to select one or more words in previously entered text 300, the user's speech following "select" 302 (i.e., partial speech recognition results are shown) must match one or more words in the previously entered text (e.g., "test" 304). Thus, the system compares (step 156) the words of the newly recognized text (e.g., "test") to the tree structure to determine (step 158) whether the words of the newly recognized text match at least a portion of the tree structure. If a match is not found, then the system enters (step 159) "select" and the remaining newly recognized text on the display screen. If a match is found, then the system highlights (step 160) the matching text 306 (FIG. 8c) and waits (steps 162 and 164) for the user to accept or reject the selection.

Figure 8D:
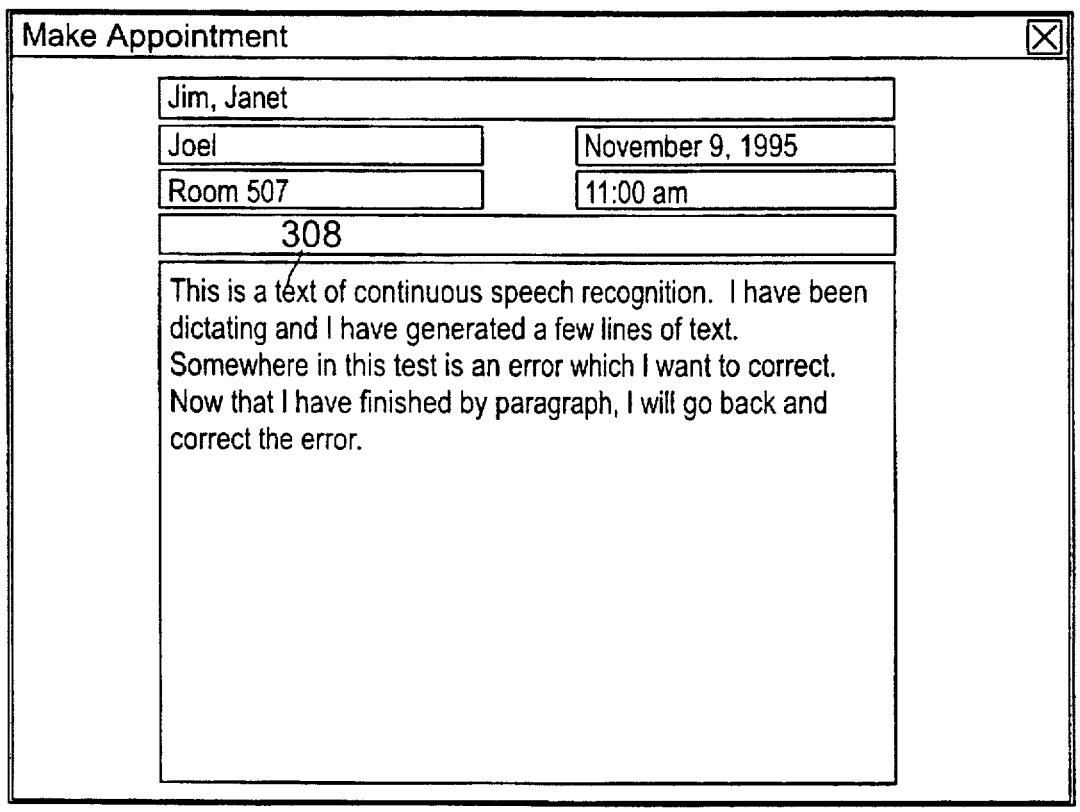

If the user agrees with the system's selection, then the user accepts (step 164) the selection, and the system selects (step 166) the matching text and waits (step 130) for user input. If the user types or speaks new text (e.g., "text"), the system replaces (steps 130–138) the selected text with the new text (e.g., "text" 308, FIG. 8d).

Figure 8E:
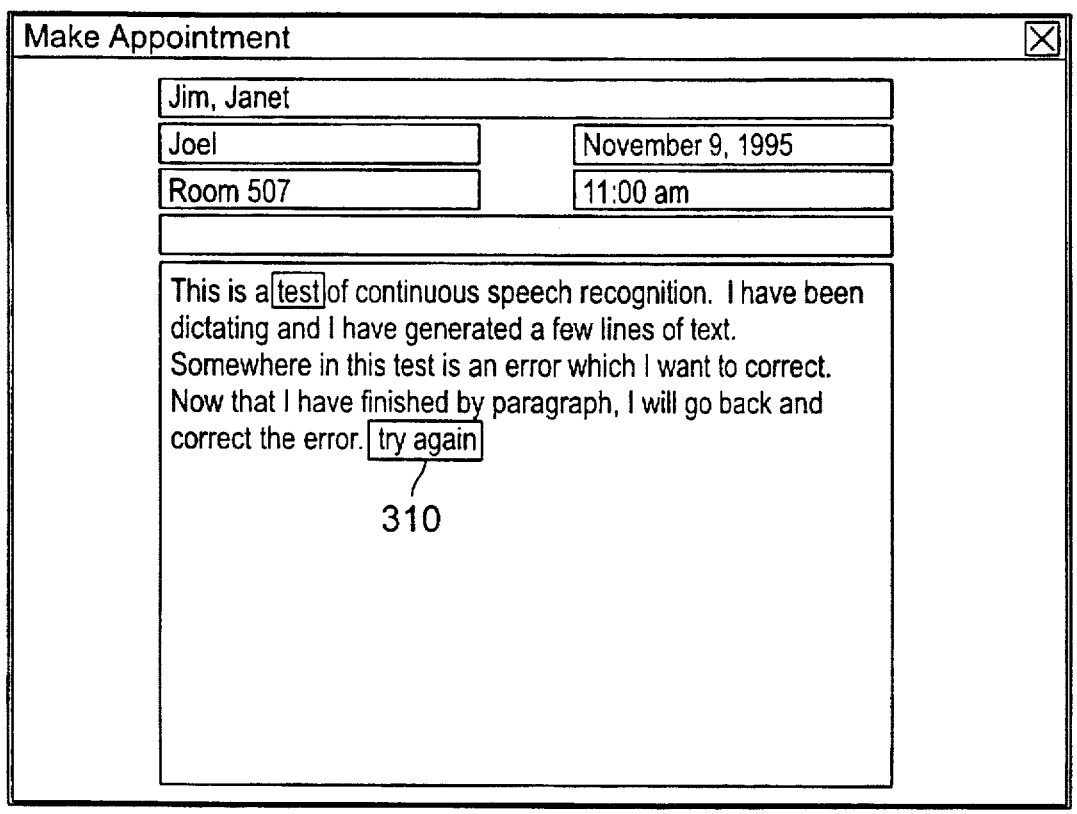
Figure 8F:
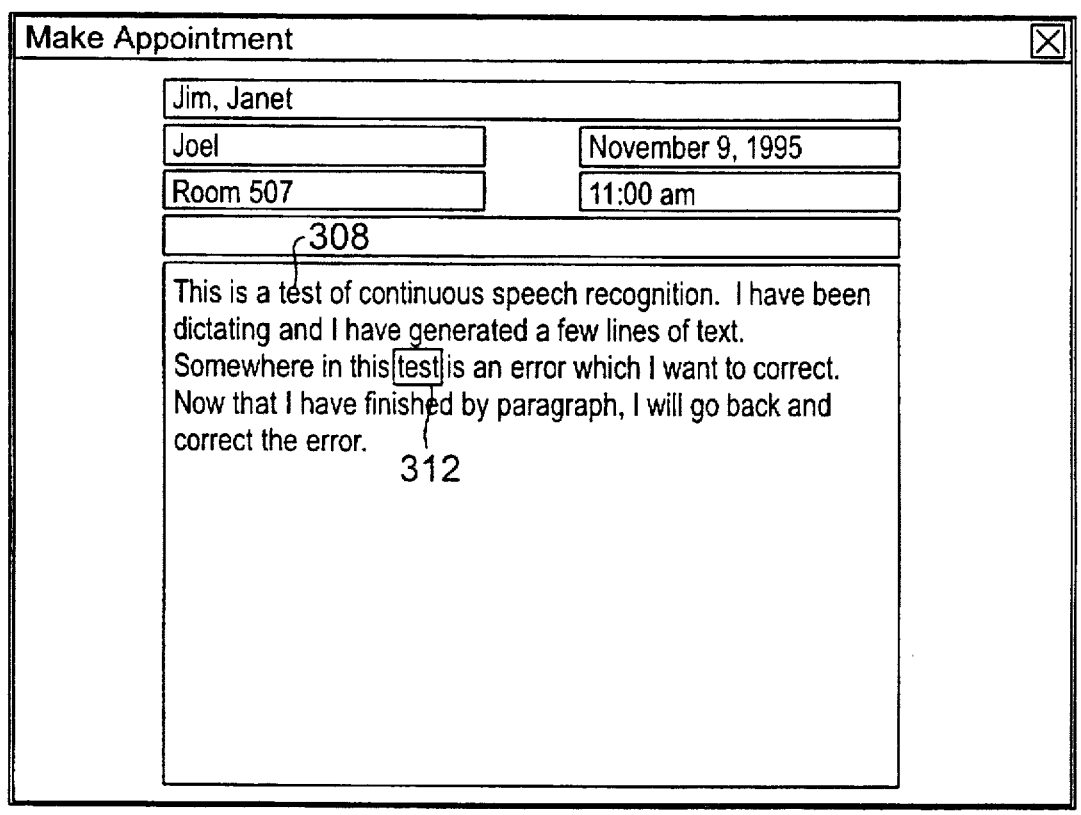
Figure 9:
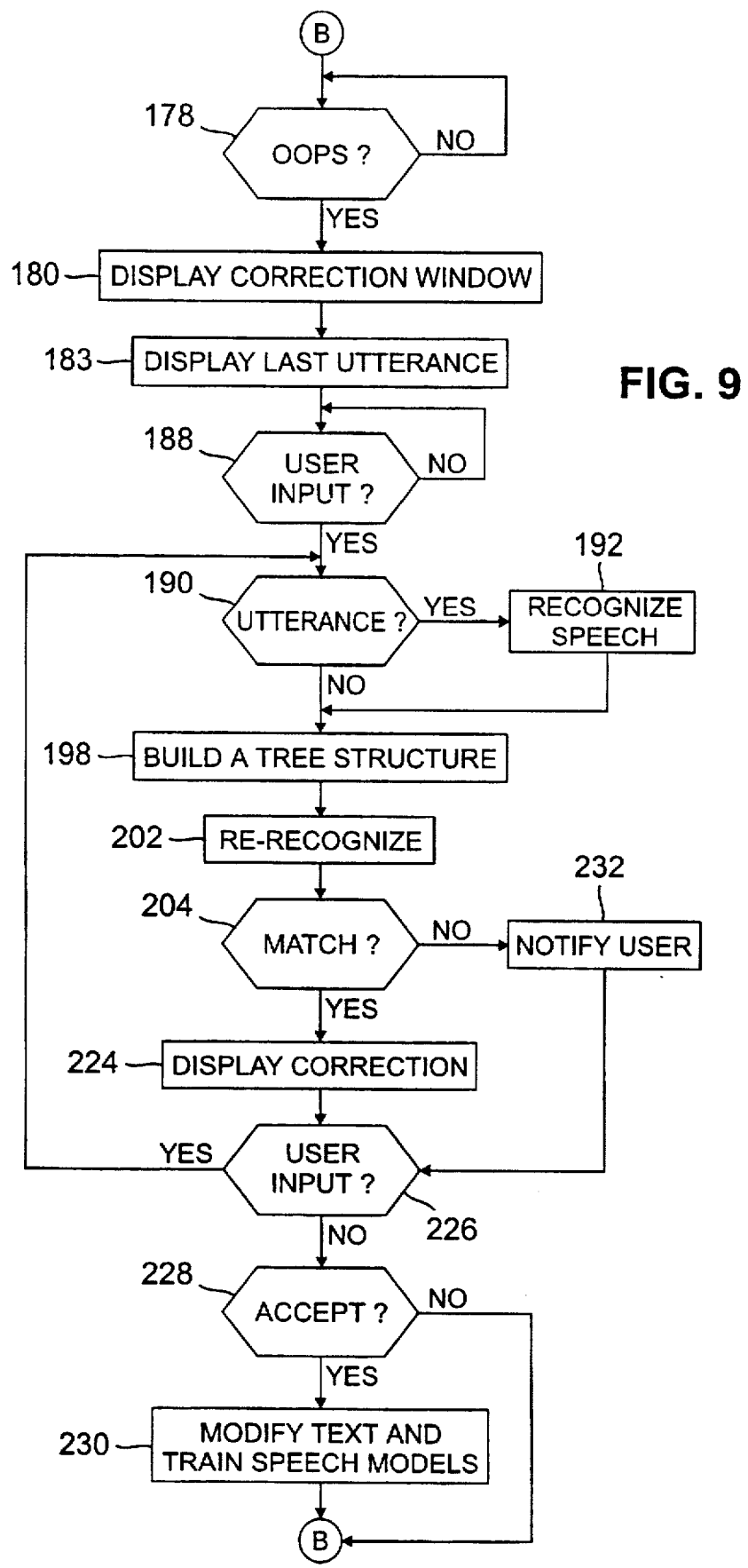
FIG. 9 is a flow chart depicting a short term error correction feature.
Figure 10A:
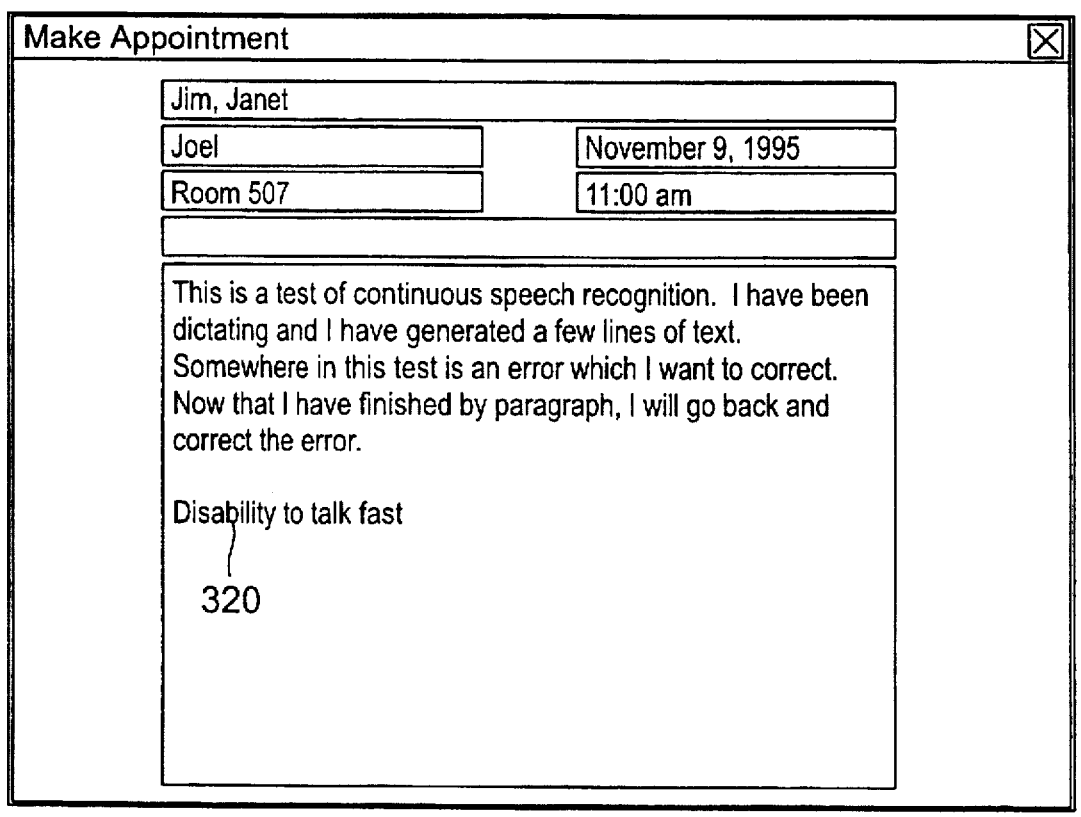
FIGS. 10a–10e are computer screen displays depicting a short term speech recognition error correction feature.
Figure 10B:
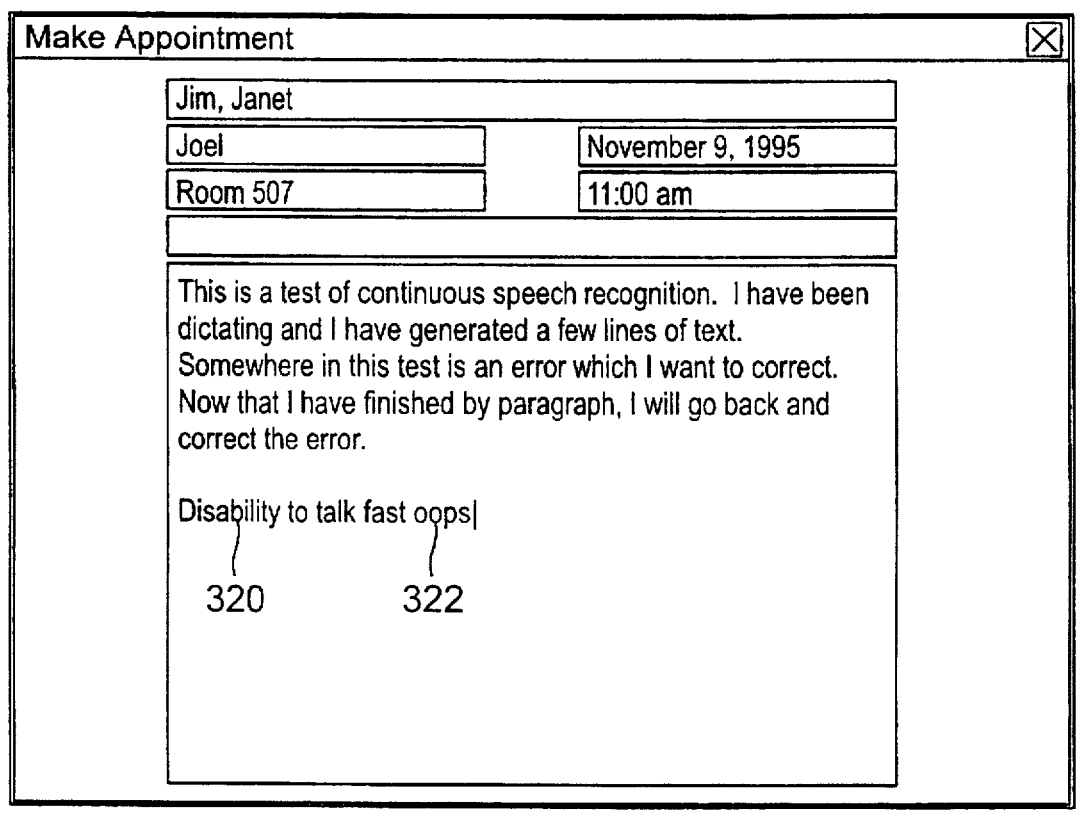
Figure 10C:
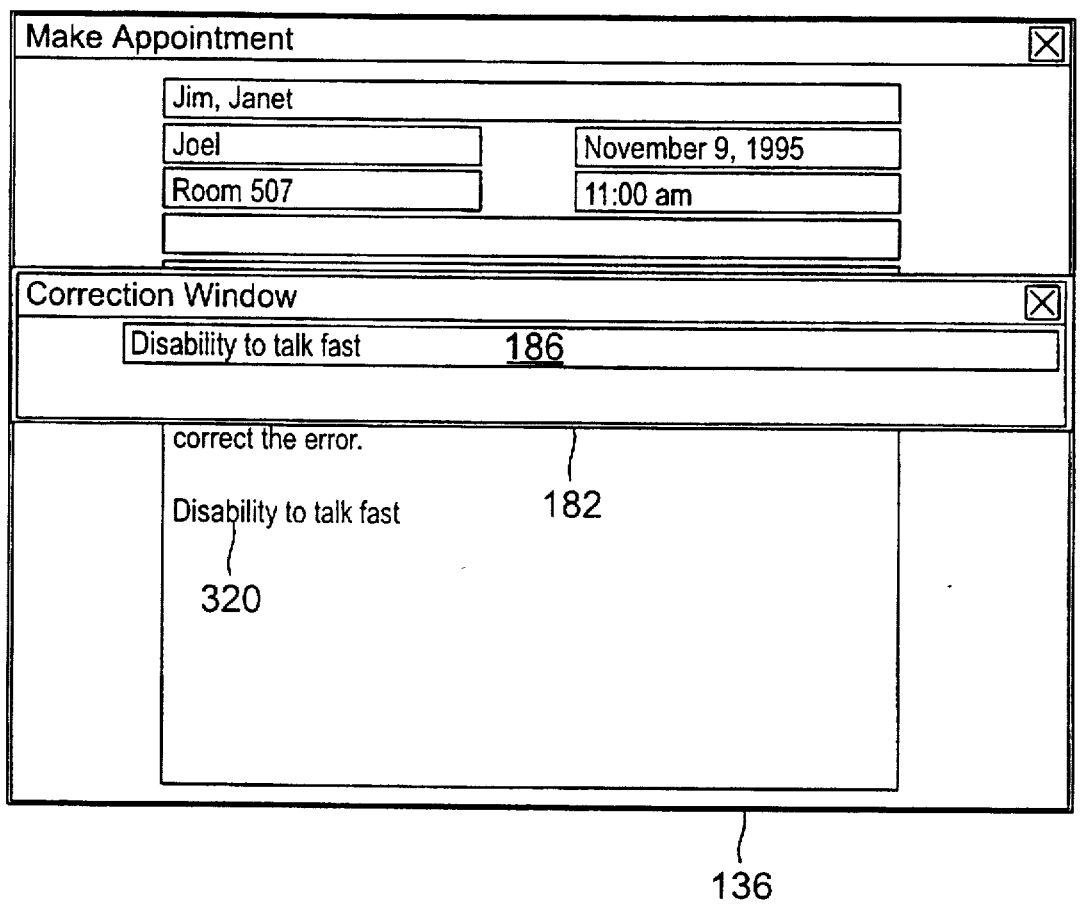
Figure 10D:
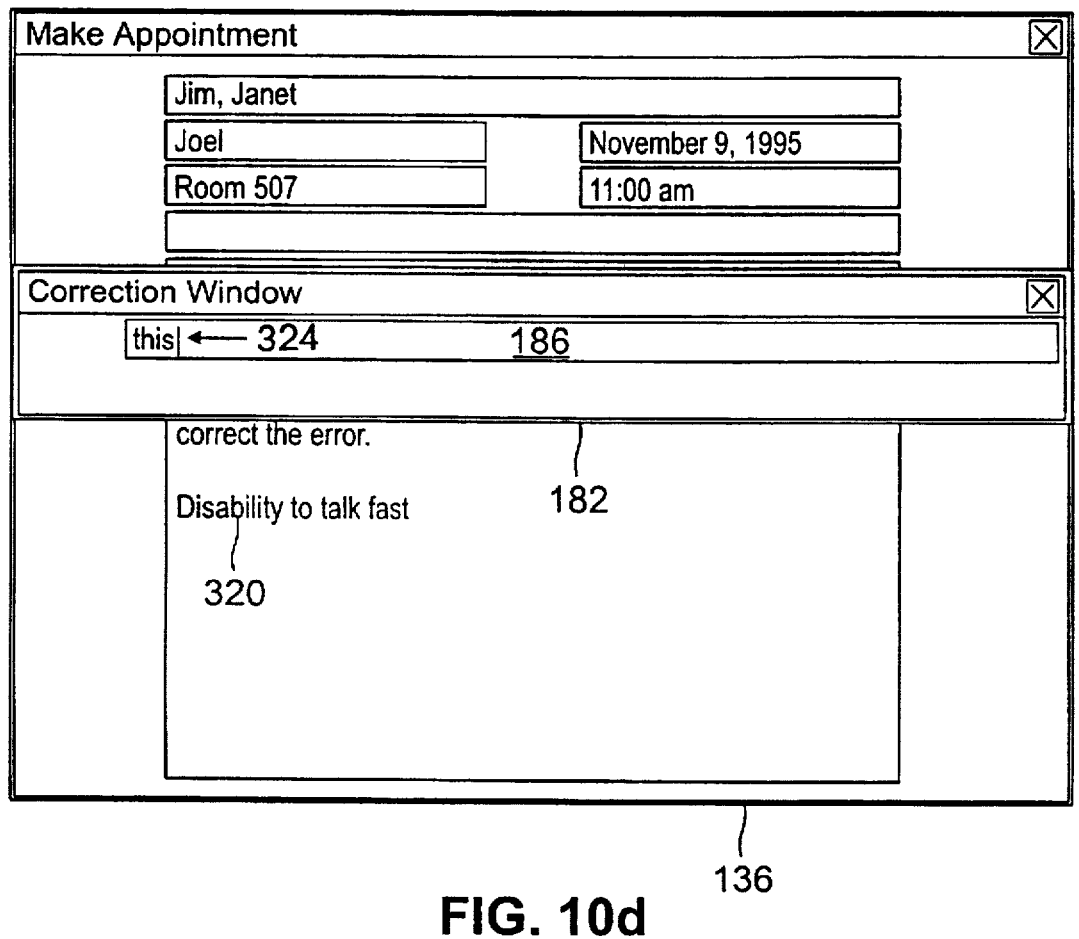
Figure 10E:
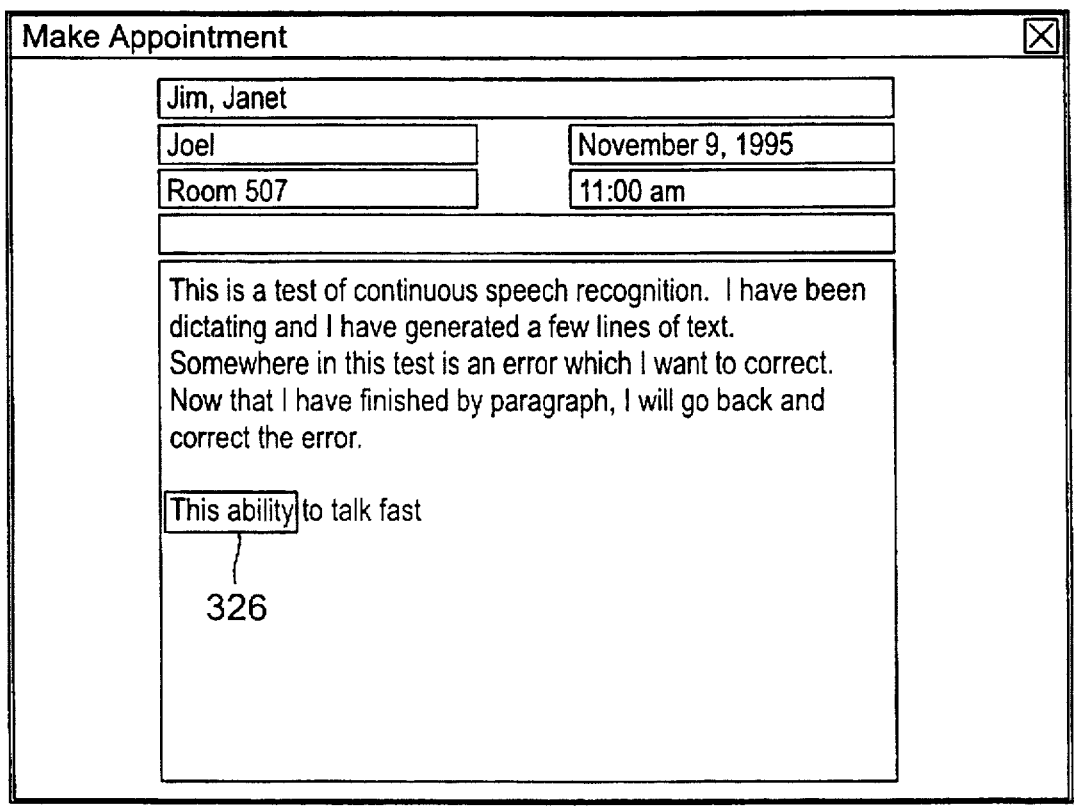

If the user does not agree with the system's selection, then the user may request (step 162) (by keystroke, mouse selection, or utterance, e.g., "try again" 310, shown as partial results on the display screen in FIG. 8e) that the system re-compare (step 156) the newly recognized text to the tree structure. If the words of the newly recognized speech are displayed at several locations on the display screen, then the newly recognized speech matches multiple portions of the tree structure. For example, if the screen displays "This is a test of continuous speech . . . Somewhere in this test is an error . . . " (FIG. 8f) and the user says "select test", then "test" matches two portions of the tree structure. Originally, the system selects the text 308 that is displayed before (or after) and closest to the top of the display screen (or closest to the current cursor position). If the user requests a re-compare, then the system selects the next closest match 312 and highlights that match.

If the newly recognized text is not displayed elsewhere on the display screen and the user requests a re-compare, then the system selects the next best match (i.e., other text that substantially matches the newly recognized text).

Instead of requesting a re-compare, the user may reject the selected text (by keystroke, mouse selection, or utterance, e.g., "abort", step 164) and exit out of the long term editing feature.

As an example, if the displayed text is "This is a test of speech" and the user says "select test" ("select a test" or "select a test of") then the system determines that "test" ("a test" or "a test of") matches a portion of the tree structure 149 (FIG. 6) and selects (i.e., highlights) "test" ("a test" or "a test of") on the display screen. If the user disagrees with the selection, then the user may request that the system re-compare the newly recognized text against the tree structure or the user may exit out of the selection. If the user agrees with the selection, then the system selects (166) the matching text. If a match is not found, then the system determines that the user was dictating text and not issuing the select command and enters (step 159) "select" and the recognized text on the display screen. For example, if the displayed text is "This is a test of speech" and the user says "select this test", the system determines that the recognized text does not match the tree structure and types "select this test" on the display screen.

Because the long term editing feature does not compare speech frames or models of a user's text selection to speech frames or models of the previously entered text, the system need not save speech frames for entire documents and the user has the flexibility to edit newly entered text in an already open document or to open an old document and edit text within that document. The system also does not adapt speech models for edited text when the long term editing feature is used because the user's edits may or may not correct speech recognition errors. This substantially prevents misadaptation. Furthermore, because the user can simultaneously replace multiple pre-existing words with multiple new words, the user may use the long term editing feature to change misrecognized word boundaries.

Short Term Speech Recognition Error Correction

The short term error correction feature allows the user to correct speech recognition errors in a predetermined number (e.g., three) of the user's last utterances. The correction may simultaneously modify one or more words and correct misrecognized word boundaries as well as train the speech models for any misrecognized word or words. The system only modifies a previous utterance and trains speech models if the user's correction substantially matches speech frames corresponding to at least a portion of the previous utterance. This substantially prevents misadaptation of speech models by preventing the user from replacing previously entered text with new words using the short term error correction feature.

Referring to FIGS. 9 and 10a–10e, when a user determines that a speech recognition error 320 has occurred within the last three utterances, the user may say "Oops" 322 (FIG. 10b) or type keystrokes or make a mouse selection of a correction window icon. When the system determines (step 178) that the user has issued the oops command, the system displays (step 180) a correction window 182 (FIG. 10c) on display screen 136 and displays (step 183) the last utterance 184 in a correction sub-window 186. The system then determines (step 188) whether the user has input (by keystroke or utterance) corrected text (e.g., "This" 324, FIG. 10d). For example, if the user said "This ability to talk fast" and the system recognized "Disability to talk fast", the user may say "oops" and then repeat or type "This" (or "This ability" or "This ability to talk", etc.).

Figure 11:
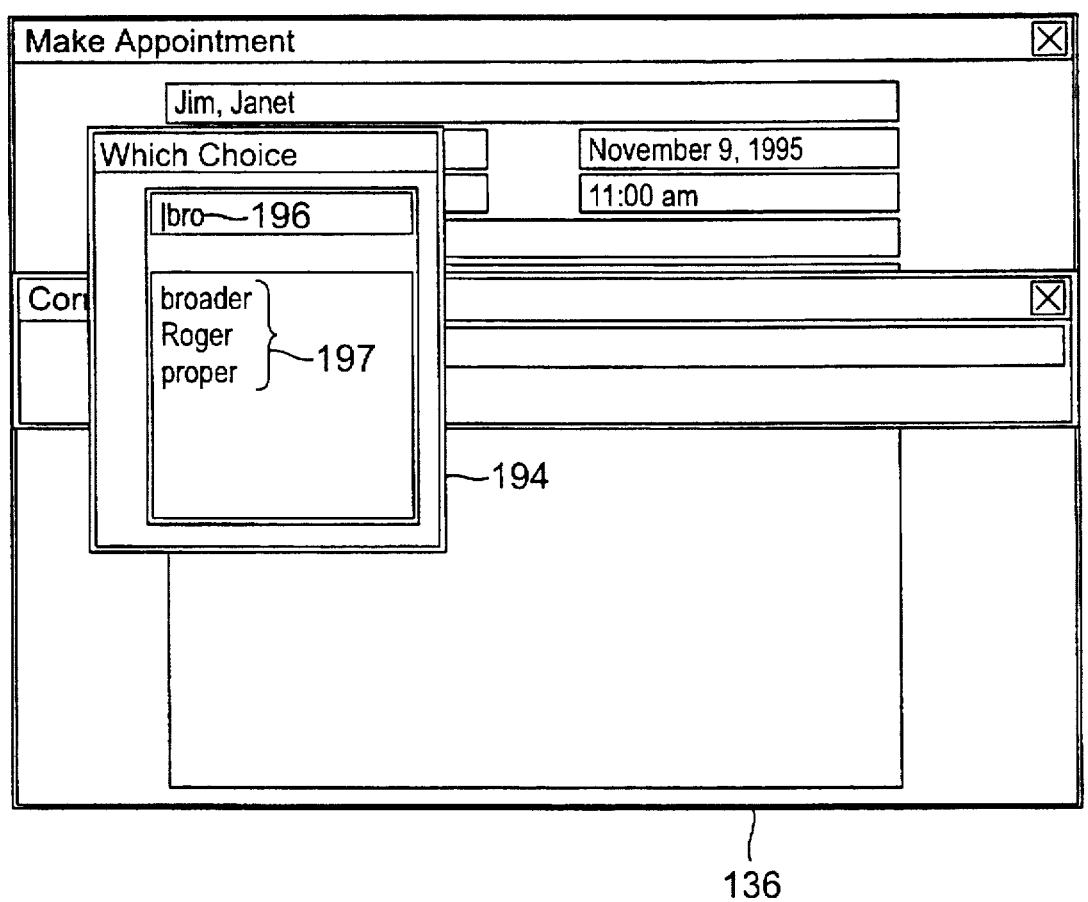
FIG. 11 is a computer screen display of a correction window and a spelling window.

If the system determines (step 190) that the user spoke the corrected text, then the system recognizes (step 192) the user's speech. Instead of providing words as corrected text, the user may enter (by keystroke, mouse selection, or utterance, e.g., "spell that", FIG. 11) a spelling command followed by the letters of the words in the corrected text. After determining that the user entered the spelling command, the system displays a spelling window 194. The system then recognizes the letters 196 spoken or typed by the user and provides a choice list 197 corresponding to the recognized letters. For more information regarding the spelling command and speech recognition of letters, see U.S. patent application Ser. No. 08/521,543, entitled "Speech Recognition", filed Aug. 30, 1995, and U.S. patent application Ser. No. 08/559,190, entitled "Speech Recognition", filed the same day and assigned to the same assignee as this application.

Referring also to FIG. 12, whether the user types or speaks the corrected text, the system builds (step 198) a tree structure (e.g., 200) for each of the last three utterances using the speech frames corresponding to these utterances and the speech frames (if spoken) or speech models (if typed) corresponding to the corrected text. The system then re-recognizes (step 202) each of the last three utterances against the corresponding tree structure to determine (step 204) if at least a portion of the speech frames in the corresponding utterance substantially match the speech frames or models corresponding to the corrected text. Each state 210–220 in the tree structure includes one or more speech frames corresponding to a previously recognized word in the utterance, the remaining speech frames in the utterance, and the speech frames or models corresponding to a first recognized word in the corrected text.

For example, if the user says "Let's recognize speech" and the system recognizes "Let's wreck a nice beach", the user may say "loops" to call up the correction window and say "recognize" as the corrected text. State 210 includes all of the speech frames of the utterance and the speech frames corresponding to "recognize", while state 216 includes only the speech frames corresponding to "nice", the remaining speech frames of the utterance (e.g., "beach"), and the speech frames corresponding to "recognize". State 220 includes only the speech frames corresponding to "recognize" to prevent the system from reaching final state 222 before at least a portion of the speech frames in the utterance are found to substantially match the speech frames corresponding to "recognize".

If the system determines that the initial speech frames of the utterance best match the speech models in the system vocabulary for the word "let's", then the system determines whether the next speech frames best match "wreck" or "recognize". If the system determines that the speech frames best match "wreck", the system determines whether the next speech frames best match "a" or "recognize". The system makes this determination for each of the originally recognized words in the utterance.

During re-recognition, the system determines which path (from state 210 to 222) has the highest speech recognition score. Initially, the system is likely to reach state 220 after re-recognizing the original utterance as it originally did, i.e., "let's wreck a nice beach". After reaching state 220, however, the system cannot match any remaining speech frames to "recognize" and reach final state 222. Thus, the score for this path is very low and the system disregards this path as a possibility. In this example, the highest scoring path is "let's recognize speech" (as opposed to other possible paths: "let's wreck recognize" or "let's wreck a recognize").

If a match for the first word of the corrected text is found, then the system transitions to final state 222 and re-recognizes the remaining speech frames of the user utterance against the entire system vocabulary. The system then displays (step 224) the proposed text correction in the correction sub-window and determines (steps 226 and 228) whether the user has provided additional corrected text (step 226) or accepted or rejected (step 228) the correction. The user may disagree with the proposed correction and input (by keystroke or utterance) additional corrected text. For instance, instead of saying "oops recognize", the user may say "oops recognize speech". The user may also reject the correction to exit out of the correction window. If the user agrees with the correction, the system modifies (step 230) the displayed text (i.e., change "Disability" 320, FIG. 10d, to "This ability" 326, FIG. 10e) and trains the speech models of the correctly recognized words against the speech frames of the original user utterance.

If no match is found (step 204) or if the score of the match is below an empirically tuned threshold, then the system notifies (step 232) the user and displays the recognized corrected text in the correction sub-window and again waits (steps 226 and 228) for user input. Displaying the corrected text allows the user to determine if he or she made an error by providing different text instead of corrected text (i.e., a repeat of the original utterance). If the user made an error, the user may try again by speaking or typing corrected text. If the user did not make an error, but the system did not find a match or found an incorrect match, then the user may input additional corrected text to improve the likelihood that a correct match will be found.

For example, instead of providing a single word "recognize" as the corrected text, the user provides multiple words "recognize speech" as the corrected text. Referring to FIG. 13, the resulting tree structure 234 generated by the system adds a state 236 that includes the speech frames or models of the second word in the corrected text (e.g., "speech"). A similar state is added for each additional word in the corrected text. After matching the first word in the corrected text to one or more speech frames in the user utterance, to reach final state 238, the system must match one or more following speech frames of the utterance to speech frames or models corresponding to each additional word in the corrected text. Additional words increase the accuracy with which speech frames from the original utterance are matched with speech frames or models from the correction.

The empirically tuned threshold substantially prevents the user from entering new text as corrected text which reduces the possibility that speech models corresponding to correctly recognized words will be misadapted. Because the corrected text may include multiple words, the user may correct multiple word misrecognitions and word boundary misrecognitions simultaneously. Limiting the number of previous utterances that may be corrected limits the number of speech frames that the system must store.

Scratch That and Repeat

Figure 14:
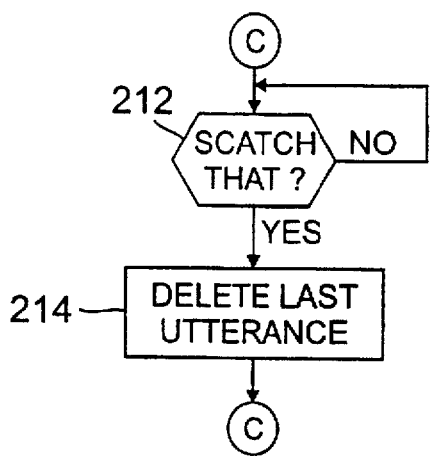
FIG. 14 is a flow chart depicting a scratch that editing feature.

The scratch that command allows the user to quickly and easily delete or delete and replace their last utterance. Referring to FIG. 14, if the system determines (step 212) that the user entered the scratch that command (i.e., keystroke, mouse selection of a scratch that icon, or utterance, e.g., "scratch that"), the system deletes (step 214) the last utterance. If the user speaks an additional utterance after the scratch that command, then the system recognizes the additional utterance and displays it on the display screen in place of the deleted utterance.

Figure 15A:
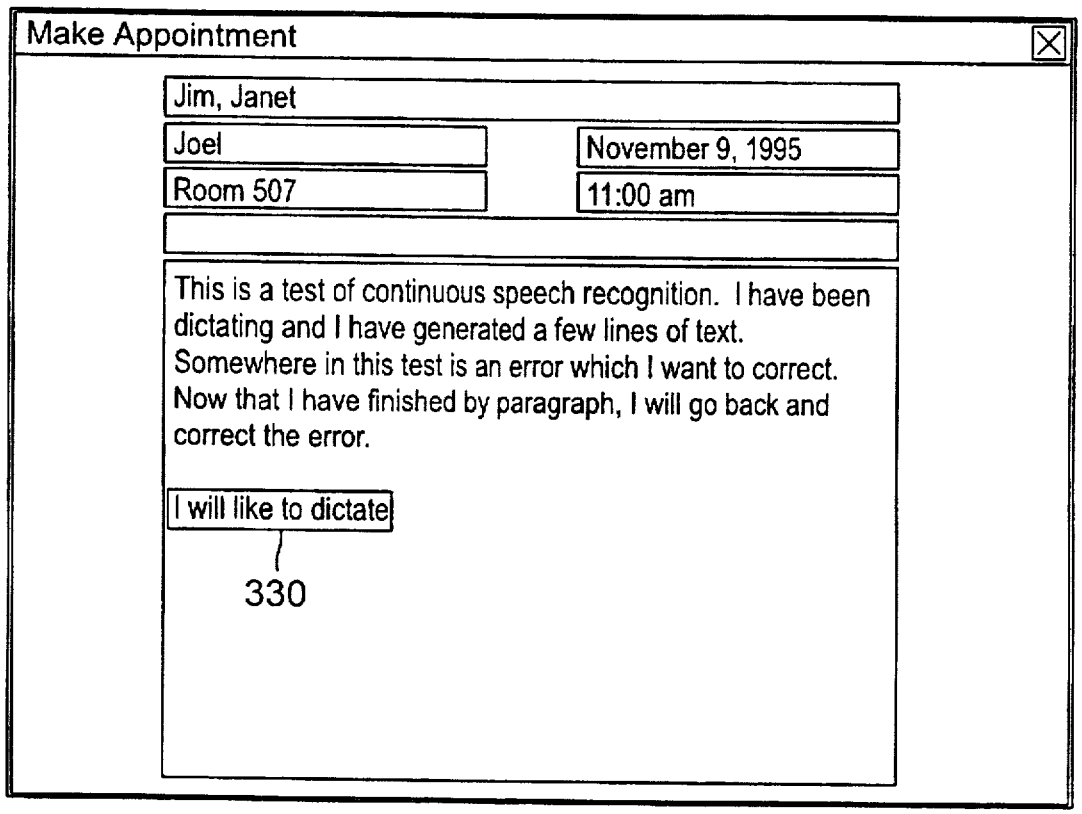
FIGS. 15a–15d show user interface screens.
Figure 15B:
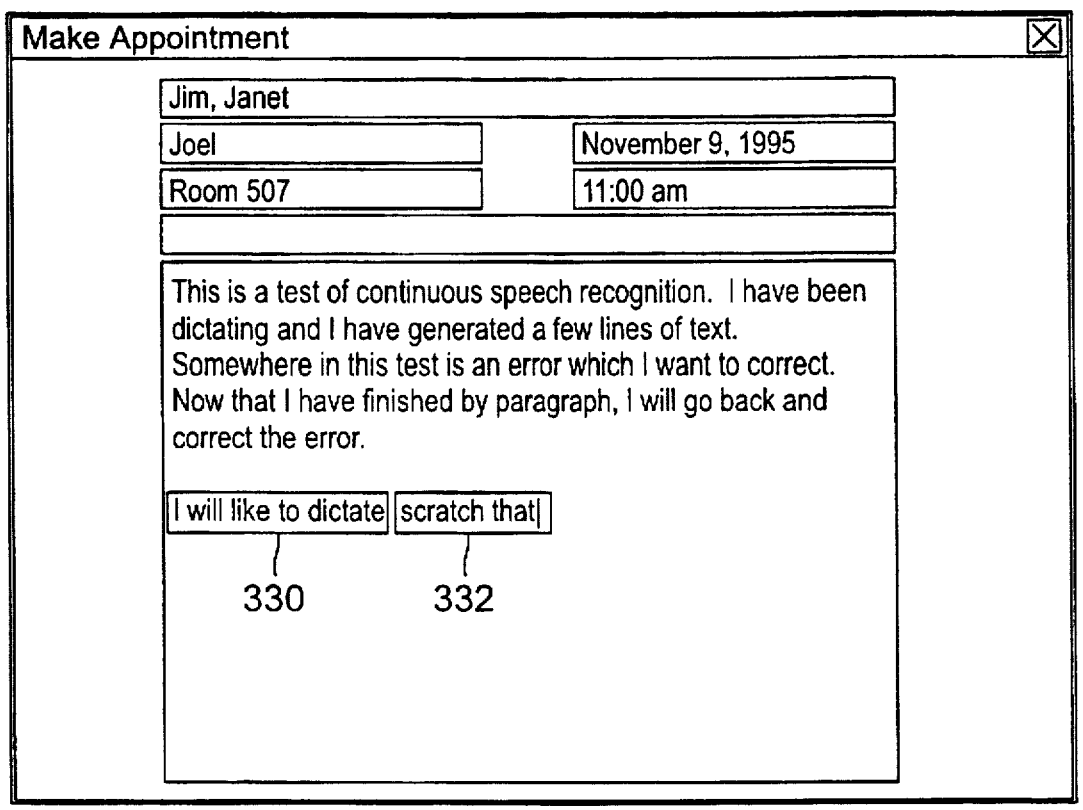
Figure 15C:
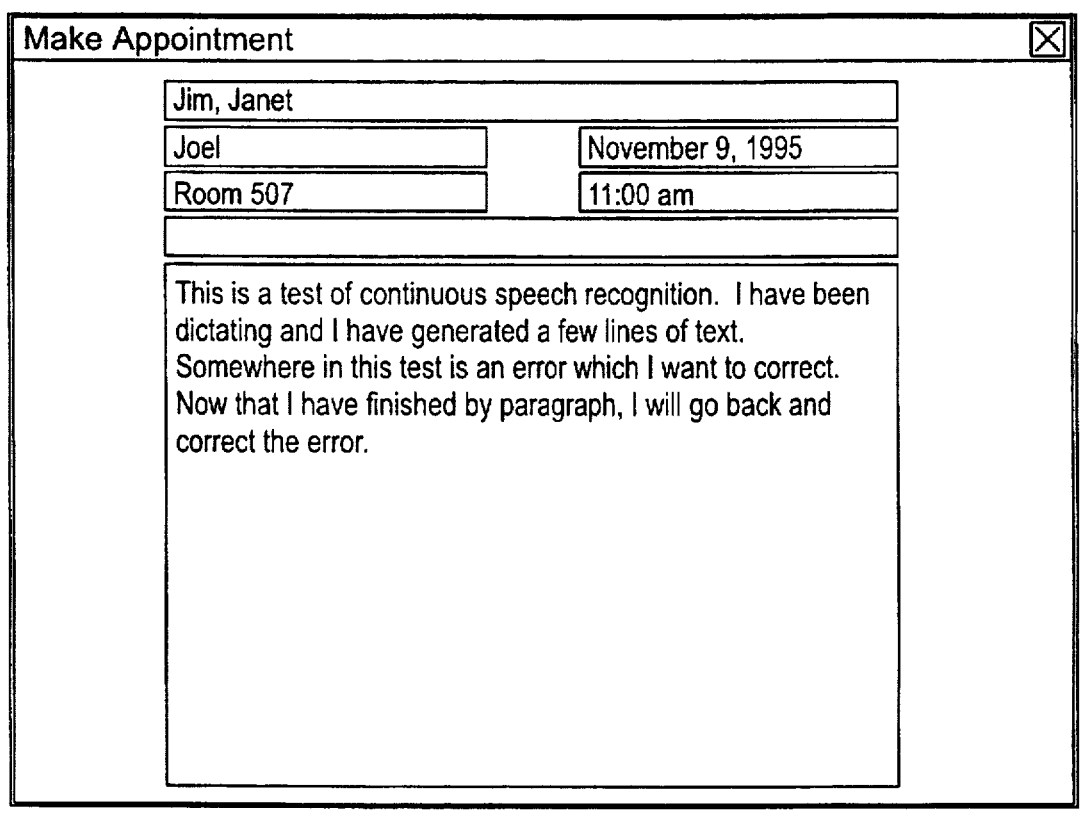
Figure 15D:
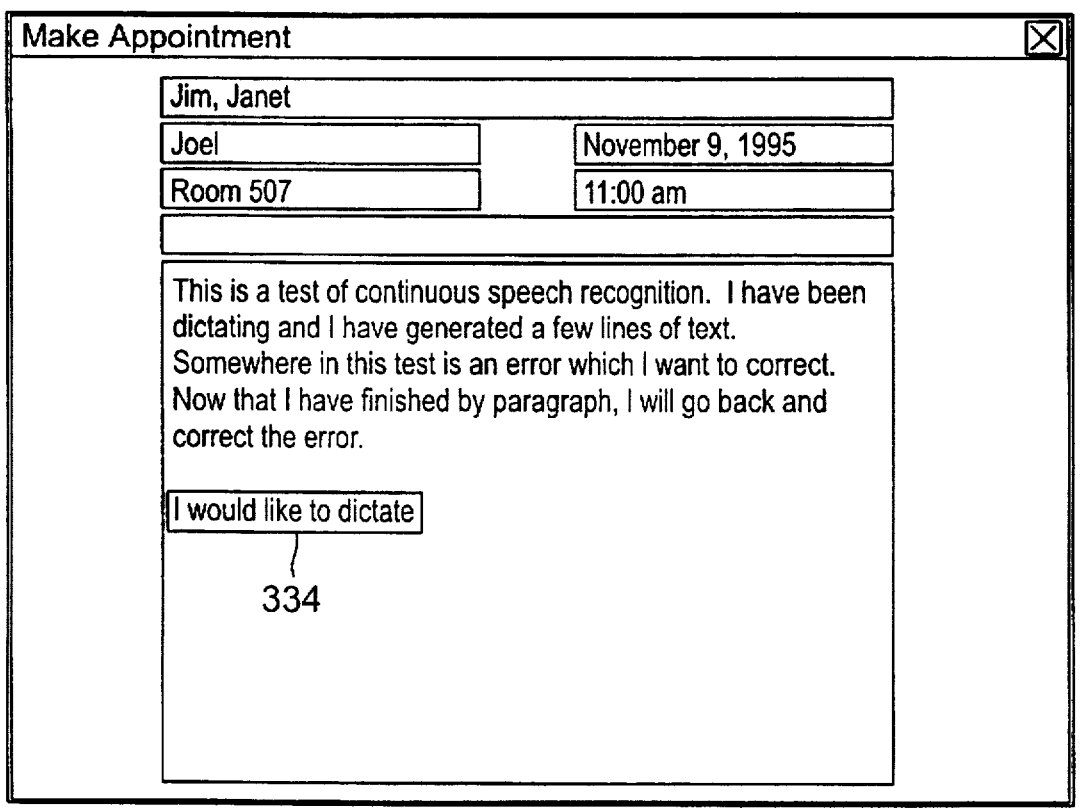

Referring to FIGS. 15a–15d, for example, if the user says "I will like to dictate" 330 (FIG. 15a) or if the user says "I would like to dictate" but the system recognizes "I will like to dictate" 330, then the user may say "scratch that" 332 (FIG. 15b) to delete that utterance (FIG. 15c). If the user made a mistake, then the user can speak the new correct text "I would like to dictate" 334 (FIG. 15d), and if the user spoke correctly but the system misrecognized the utterance, then the user can repeat the utterance "I would like to dictate" 334. In either case, the system recognizes the speech and displays it on the display screen.

Because the user may use the scratch that command to edit previous text or correct speech recognition errors, the system does not adapt speech models when the user enters the scratch that command. This substantially prevents misadaptation of speech models.

Other embodiments are within the scope of the following claims.

For example, instead of having a digital signal processor (DSP) process the samples corresponding to each speech frame to generate a group of parameters associated with the analog data signal during each 20 ms time period, the CPU includes front-end processing software that allows the CPU to generate the parameters.

As another example, speech models may be selectively trained when the long term editing feature and/or the scratch that command are used. For example, the user may be given control over when speech models are adapted. With such control, the user may decide when a speech recognition error has occurred and have the system train speech models in accordance with that determination. As another example, the system may be given control over when speech models are adapted. If the system determines that the user corrected a speech recognition error, then the system trains the speech models accordingly.

Many optimizations to improve speech recognition performance are possible. For example, typed text cannot cause speech recognition errors, and, as a result, during short term error correction re-recognition (step 202, FIG. 10) when the system is re-recognizing the remaining speech frames against the system vocabulary (state 222, FIG. 12), the system may increase the speech recognition score for words matching text that the user entered through keystrokes.

Pseudo-Code

Following is pseudo-code derived from C Programming Language Code that describes the process for Long Term Editing and Short Term Speech Recognition Error Correction:

| Long Term Editing |
|---|
| start:<br>  wait for start of speech<br>  start recognition of speech<br>  if first word of the recognition is "select" |

```
                build-the-select-grammar
                recognize the utterance against the select-grammar
                if the recognition matches the select-grammar
                    search-for-the-indicated-words
                        remember the utterance and recognition results as
                            last-select-result
                        goto start
                    otherwise,
                        interpret recognition as text
                        type-text-on-the-screen
                        delete the last-select-result
                        goto start
                otherwise,
                if the recognition matches "try again" and there is a
                    last-select-result
                    search-for-the-indicated-words in the last-select-result
                    if the words found by the search are not the exact same
                        occurrences which were first selected by this
                        transcription of the results
                        goto start
                    otherwise,
                        change the last-select-result to the next best unused
                            transcription of the utterance saved in
                            last-select-result
                        if there are no more unused transcriptions in
                            last-select-result
                            goto start
                        otherwise,
                            search-for-the-indicated-words in the next best
                                transcription
                            goto start
                otherwise,
                    continue recognition
                    type-text-on-the-screen
                    delete the last-select-result
                    goto start
        search-for-the-indicated-words:
            set the current word to be the word on the screen just
                before the selection
        loop:
            if the text on the screen starting with the current word
                matches the indicated words
                set the selection to text on the screen just compared
                    against
                return from subroutine
            otherwise,
                if the current word is the first word on the screen
                    set the current word to be the last word on the screen
                otherwise,
                    change the current word to be the word on the screen
                        before the current word
                then,
                    if the current word is the first word in the selection
                        return from subroutine
                    otherwise,
                        goto loop
        type-text-on-the-screen:
            if words are selected on the screen
                delete the words which are selected
                leave the insertion point at the point where words were
                    deleted
                type the text at the current insertion point
            otherwise,
                type the text at the current insertion point
        build-the-select-grammar:
            create a state with the word "select"
            create a large state which will hold all the words
            add a transition from the word "select" to the large state
            set the last-small-state variable to null
            set the last-word-in-large-state variable to null
            read the screen into a buffer
            parse the buffer into a series of words
            for each word in the buffer
                look the word up in the dictionary to get a speech model
                if the word is not in the dictionary
                    try to create a speech model for this word by
                        generating a pronunciation using text to speech
                        synthesis rules
                    if no speech model can be created for this word
                        skip this word
                        set the last-small-state variable to null
                        set the last-word-in-large-state variable to null
                        continue with the next word in the buffer
                then,
                    create a small state containing only this word
                    if the last-small-state variable is not null
                        add a transition from the last-small-state to this new
                            state
                    set the last-small-state variable to be this newly
                        created small state
                    if the last-word-in-large-state variable is not null
                        add a transition from the last-word-in-large-state to
                            this new state
                    if the word is not in the large state
                        add the word to the large state
                        set the last-word-in-large-state variable to this new
                            word
                        continue with the next word in the buffer
                    otherwise,
                        set the last-word-in-large-state variable to the
                            existing occurrence of the word in the large
                            buffer
                    continue with the next word in the buffer
                if there are no more words in the buffer
                    return from subroutine
                            Short Term Speech Recognition Error Correction start:
            wait for speech
            recognize the speech
            remember the utterance in a four element
                first-in-first-out (FIFO) queue
            if utterance is not "oops"
                perform the indicated command or type the recognized
                    text
                goto to start
            otherwise,
                concatenate the results from the last four utterances in
                    the FIFO queue into a single long string
                display a correction dialog box with two fields, the
                    first field should be blank and the second
                    field should contain the concatenated results
                goto loop
        loop:
            wait for speech or another user action
            if more than 2 seconds have elapsed since the contents
                of the first field in the dialog have changed
                recompute-the-correction
                goto loop
            otherwise,
            if speech is detected and the speech recognized "press
                OK" or the user clicks the mouse on the OK
                button, or the user presses the enter key
                if the contents of the first field in the dialog have
                    changed since the correction was last
                    recomputed
                    recompute-the-correction
                then,
                if there is a corrected utterance
                    update-the-original-document
                then,
                destroy the correction dialog
                goto start
            otherwise,
            if speech is detected and the speech recognized "press
                Cancel" or the user clicks the mouse on the
                Cancel button, or the user presses the escape
                key
                destroy the correction dialog
                goto start
            otherwise,
            if speech is detected
                recognize the speech
                enter the recognized text into the first field of the
                    dialog
                record that the first field of the dialog has changed
                goto loop
            otherwise,
            if the user starts typing
                enter the typed keystrokes into the first field of the
```

```
        dialog
            record that the first field of the dialog has changed
            goto loop
        otherwise,
            goto loop
update-the-original-document:
    find the corrected utterance in the original document
    remove the original text of the corrected utterance
    replace the original text with the corrected text
    return from subroutine
recompute-the-correction:
    read the contents of the first field of the dialog into a
        buffer
    parse the buffer into a series of words
    for each word in the buffer
        look the word up in the dictionary to get a speech model
        if the word is not in the dictionary
            try to create a speech model for this word by
                generating a pronunciation using text to speech
                synthesis rules
            if no speech model can be created for this word
                display an "unknown word" error to the user
                return from subroutine
            otherwise,
                remember these words as the target words
    then,
    for each utterance in the FIFO queue
        compute-a-possible-correction for this utterance and the
            target words
        record the score of this possible correction and the
            correction itself
    then,
    compute the maximum score of all computed possible
        corrections
    if the maximum score is zero
        display "utterance can not be corrected" error to the
            user
        return from subroutine
    otherwise,
        remember the highest scoring computed possible
            correction as the corrected utterance
        concatenate the results from the last four utterances in
            the FIFO queue into a single long string
        replace the results for the corrected utterance with the
            computed possible correction
        replace the second field with the corrected concatenated
            string
        highlight the words in the corrected results which
            correspond to the words in the first field of
            the dialog box
        return from subroutine
compute-a-possible-correction:
    create-a-correction-grammar using the utterance and the
        target words
    recognize the utterance against the correction grammar
    look in the results for the target words
    if the target words do not appear in the results
        return 0
    otherwise,
        record the results of the recognition as a possible
            correction
        return the score from the recognition
create-a-correction-grammar:
    set the last-target-word to NULL
    for every target word
        create a small state containing the next target word
        if the last-target-word is not NULL
            add a transition from the last-target-word to this new
                small state
        set the last-target-word equal to the current target
            word
    then,
    add a transition from the last-target-word to the state of
        all words in the vocabulary
    set the last-original-word to NULL
    for every word in the original recognition results
        create a small state containing the next word in the
            original results
        if the last-original-word is not NULL
            add a transition from the last-original-word to this
                new small state
            then,
            if the current word in the original recognition results
                is not the same as the first target word
                add the first target word to this state
            then,
            if there is only one target word
                add a transition from the first target word in this
                    new small state to the state of all words in
                    the vocabulary
            otherwise,
                add a transition from the first target word in this
                    new small state to the small state created
                    earlier which contains the second target word
            then,
            set the last-original-word equal to the current word in
                the original results
            then,
            add a transition from the last-original-word to the small
                state created earlier which contains the first
                target word
    return from subroutine
```

What is claimed is:

1. A method for use in recognizing speech comprising:
    accepting signals corresponding to interspersed speech elements including text elements corresponding to text to be recognized and command elements to be executed,
    recognizing the elements, and
    executing modification procedures in response to recognized predetermined ones of the command elements, including:
        simultaneously modifying previously recognized ones of the text elements in response to a single one of the recognized predetermined ones of the command elements.

2. The method of claim 1, wherein
    executing modification procedures includes executing modification procedures that modify the set of elements in response to recognized predetermined ones of the command elements that include a first modification command element that corrects a speech recognition error and a second modification command element that modifies the set of elements without correcting a speech recognition error, including:
        training speech models when the modification procedures are in response to the first modification command element, and
        refraining from training speech models when the modification procedures are in response to the second modification command element.

3. The method of claim 1 in which simultaneously modifying previously recognized text elements includes simultaneously modifying text element boundaries of the previously recognized ones of the text elements.

4. The method of claim 3 in which the text element boundaries were misrecognized.

5. The method of claim 2 in which the command indicates that the user wishes to delete a recognized text element.

6. The method of claim 5 in which the text element is the most recently recognized text element.

7. The method of claim 5 in which the command comprises "scratch that".

8. The method of claim 5 in which the command is followed by a pause and the most recently recognized text element is then deleted.

9. The method of claim 5 in which the command is followed by an utterance corresponding to a substitute text element and the substitute text element is then substituted for the most recently recognized text element.

10. A method for use in recognizing speech comprising:

accepting signals corresponding to interspersed speech elements including text elements corresponding to text to be recognized and command elements to be executed, recognizing the elements by producing a set of elements associated with the signals, and executing modification procedures that modify the set of elements in response to recognized predetermined ones of the command elements;

wherein:

the command elements include an utterance representing a selected recognized text element to be corrected, and the modification procedures include matching the selected recognized text element against previously recognized text elements.

11. A method for use in recognizing speech comprising:

accepting signals corresponding to interspersed speech elements including text elements corresponding to text to be recognized and command elements to be executed, recognizing the elements by producing a set of elements associated with the signals, and executing modification procedures that modify the get of elements in response to recognized predetermined ones of the command elements;

wherein:

the modification procedures include parsing previously recognized text elements and building a tree structure that represents the ordered relationship among the previously recognized text elements.

12. The method of claim 11 in which executing the modification procedures includes:

detecting a speech recognition error, and training speech models in response to the detected speech recognition error.

13. The method of claim 12 in which detecting further includes:

determining whether speech frames or speech models corresponding to a speech recognition modification match at least a portion of the speech frames or speech models corresponding to previous utterances.

14. The method of claim 13, further including:

selecting matching speech frames or speech models.

15. The method of claim 11 in which the predetermined ones of the command elements include a select command.

16. The method of claim 15 in which the command elements include an utterance representing a selected recognized text element to be corrected.

17. The method of claim 11 in which the tree structure reflects multiple occurrences of a given previously recognized one of the text elements.

18. The method of claim 15 in which the utterance represents a sequence of multiple selected recognized text elements.

19. The method of claim 11 in which the modification procedures include modifying one of the recognized text elements.

20. The method of claim 19 in which the modifying is based on correction information provided by a user.

21. The method of claim 20 in which the correction information is provided by the user speaking substitute text elements.

22. The method of claim 21 in which the correction information includes correction of boundaries between text elements.

23. A method for use in recognizing speech comprising:

accepting signals corresponding to interspersed speech elements including text elements corresponding to text to be recognized and command elements to be executed, recognizing the elements by producing a set of elements associated with the signals, and executing modification procedures that modify the set of elements in response to recognized predetermined ones of the command elements;

wherein the modification procedures include building a tree structure grouping speech frames corresponding to possible text elements in branches of the tree.

24. The method of claim 23 in which the modification procedures include modifying one or more of the most recently recognized text elements.

25. The method of claim 24 in which the predetermined ones of the command elements include a command indicating that a short term correction is to be made.

26. The method of claim 25 in which the command comprises "oops".

27. The method of claim 24 in which the modification procedures include interaction with a user with respect to modifications to be made.

28. The method of claim 27 in which the interaction includes a display window in which proposed modifications are indicated.

29. The method of claim 27 in which the interaction includes a user uttering the spelling of a word to be corrected.

30. The method of claim 23 in which the modification procedures include re-recognizing the most recently recognized text elements using the speech frames of the tree structure.

31. The method of claim 23 in which the tree is used to determine, text element by text element, a match between a correction utterance and the originally recognized text elements.

32. The method of claim 31 in which the modification procedures include, after determining a match, re-recognizing subsequent speech frames of an original utterance.

33. The method of claim 2 in which, if no match is determined, the recognized correction utterance is displayed to the user.

* * * * *

(12) EX PARTE REEXAMINATION CERTIFICATE (7104th)
United States Patent
Gould

(10) Number: US 5,794,189 C1
(45) Certificate Issued: Oct. 13, 2009

(54) CONTINUOUS SPEECH RECOGNITION

(75) Inventor: Joel M. Gould, Winchester, MA (US)

(73) Assignee: USB AG, Stamford, CT (US)

Reexamination Request:
No. 90/008,545, Mar. 14, 2007

Reexamination Certificate for:
Patent No.: 5,794,189
Issued: Aug. 11, 1998
Appl. No.: 08/556,280
Filed: Nov. 13, 1995

(51) Int. Cl.
*G10L 15/26* (2006.01)
*G10L 15/00* (2006.01)
*G10L 15/22* (2006.01)

(52) U.S. Cl. .................. 704/231; 704/232; 704/251; 704/257; 704/258; 704/E15.044

(58) Field of Classification Search .................. None
See application file for complete search history.

(56) References Cited

PUBLICATIONS

Kurzweil Applied Intelligence, Kurzweil Voiceworks v 1.4 Tutorial and Reference Manual, 1987.*
Dragon Dictate v2.0 User's Guide, 1993.*

* cited by examiner

*Primary Examiner*—Woo H. Choi

(57) ABSTRACT

A method for use in recognizing speech in which signals are accepted corresponding to interspersed speech elements including text elements corresponding to text to be recognized and command elements to be executed. The elements are recognized. Modification procedures are executed in response to recognized predetermined ones of the command elements. The modification procedures include refraining from training speech models when the modification procedures do not correct a speech recognition error. In another aspect, the modification procedures include simultaneously modifying previously recognized ones of the text elements.

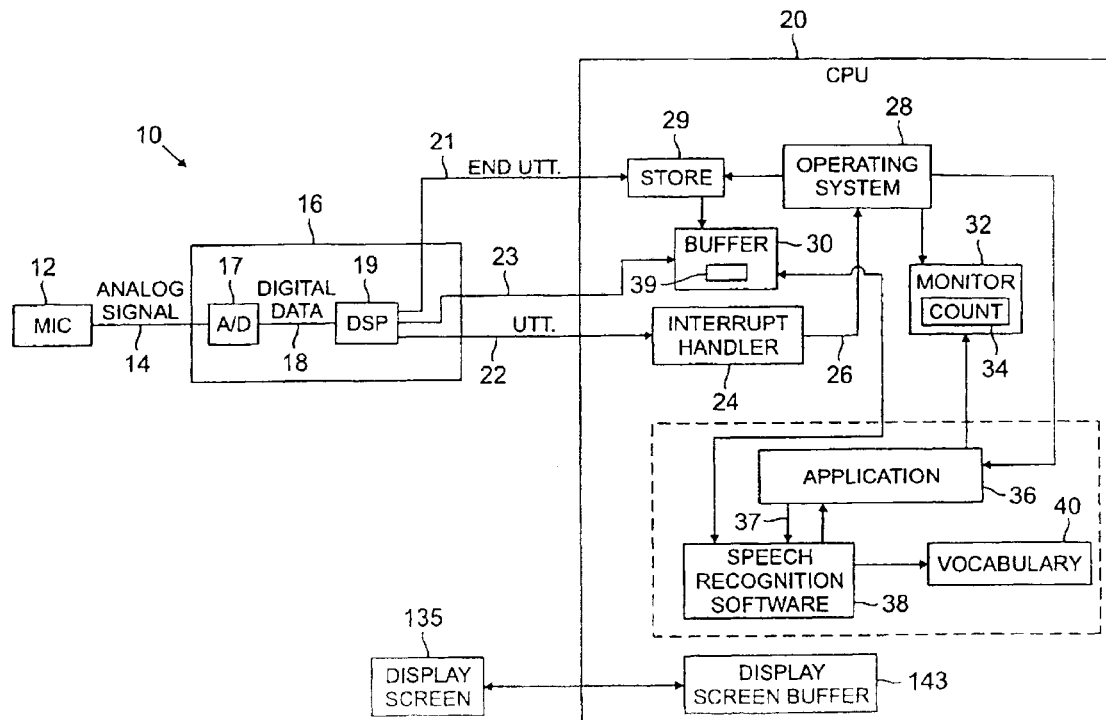

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 10 are cancelled.

Claim 1 is determined to be patentable as amended.

Claims 2 and 5–9, dependent on an amended claim, are determined to be patentable.

Claims 4 and 11–33 were not reexamined.

1. A method for use in recognizing speech comprising:

accepting signals corresponding to interspersed speech elements including text elements corresponding to text to be recognized and command elements to be executed, recognizing the elements, and executing modification procedures in response to recognized predetermined ones of the command elements, including:

simultaneously modifying previously recognized ones of the text elements in response to a single one of the recognized predetermined ones of the command elements *including simultaneously modifying text element boundaries of the previously recognized ones of the text elements.*

\* \* \* \* \*